Figure 1:
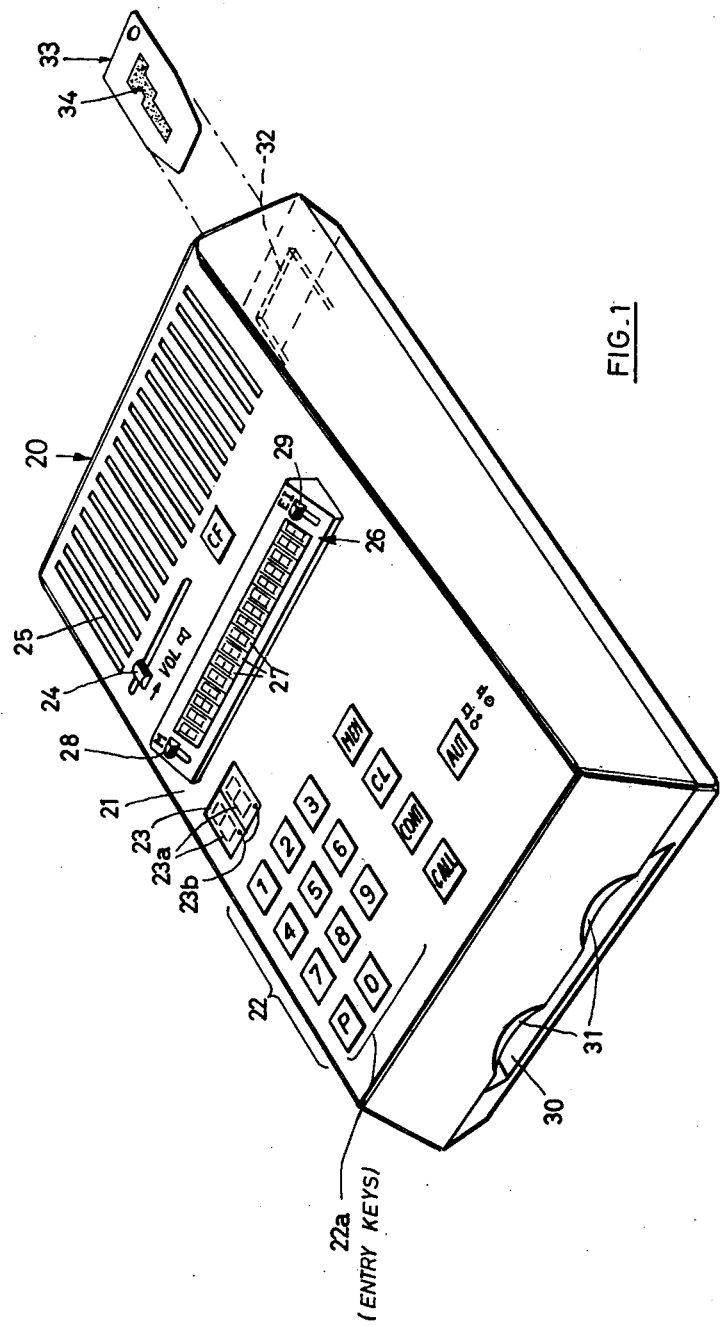

United States Patent [19]

Nicoud et al.

[11] 4,039,761
[45] Aug. 2, 1977

[54] ELECTRONIC APPARATUS FOR THE PERMANENT STORAGE AND AUTOMATIC DIALING OF TELEPHONE NUMBERS

[75] Inventors: Jean-Daniel Nicoud, Lausanne; Jean-Marie Rouiller, Couvet, both of Switzerland

[73] Assignee: Stoppani S.A., Etablissements pour la mecanique de precision et l'electro-mecanique, Bern, Switzerland

[21] Appl. No.: 579,079

[22] Filed: May 19, 1975

[30] Foreign Application Priority Data

May 20, 1974 Switzerland .................... 6907/74

[51] Int. Cl.² ............................................. H04M 1/45
[52] U.S. Cl. .................................................. 179/90 B
[58] Field of Search ........... 179/90 AN, 90 B, 90 BB, 179/90 BD, 90 K, 2 DP, 18 DA

[56] References Cited

U.S. PATENT DOCUMENTS

| 3,341,666 | 9/1967 | Wallace, Jr. .................. | 179/90 BD |
| 3,670,111 | 6/1972 | Bukosky et al. ............... | 179/90 BD |
| 3,735,050 | 5/1975 | Maldas ........................ | 179/90 B |
| 3,760,121 | 9/1973 | Nissim ........................ | 179/90 AN |
| 3,787,639 | 1/1974 | Battrick ...................... | 179/90 K |
| 3,856,982 | 12/1974 | Lawson et al. ................ | 179/90 K |
| 3,873,781 | 3/1975 | Nissim ........................ | 179/81 R |
| 3,882,284 | 5/1975 | Munday ....................... | 179/90 B |

*Primary Examiner*—Kathleen H. Claffy
*Assistant Examiner*—Gerald L. Brigance
*Attorney, Agent, or Firm*—LeBlanc & Shur

[57] ABSTRACT

An electronic apparatus for storage and automatic dialing of telephone numbers comprises memory means including a plurality of tracks for storing a plurality of telephone numbers, these means being capable of storing data representing ten digits and a pause order, preparation and storage control means for monitoring and effecting the storage operations of these data, keyboard means for selecting one of the tracks, for ordering the storage of the data on the selected track, and for ordering automatic dialing of telephone numbers memorized in any selected track, and means for reading the data in the selected track and for dealing the corresponding telephone number by actuating a transmission device which sends pulses. The keyboard means, which comprises digits and pause-order entry keys, also comprises command keys, for ordering the call of a stored telephone number, involving first an operation of restoring and reclaiming the telephone line, and then dialing operations, and for ordering a continuation of dialing a number, without a line-restoring-and-reclaiming operation, after a first part of this number has already been dialed, followed by a stopping of dialing responsive to a pause order.

27 Claims, 18 Drawing Figures

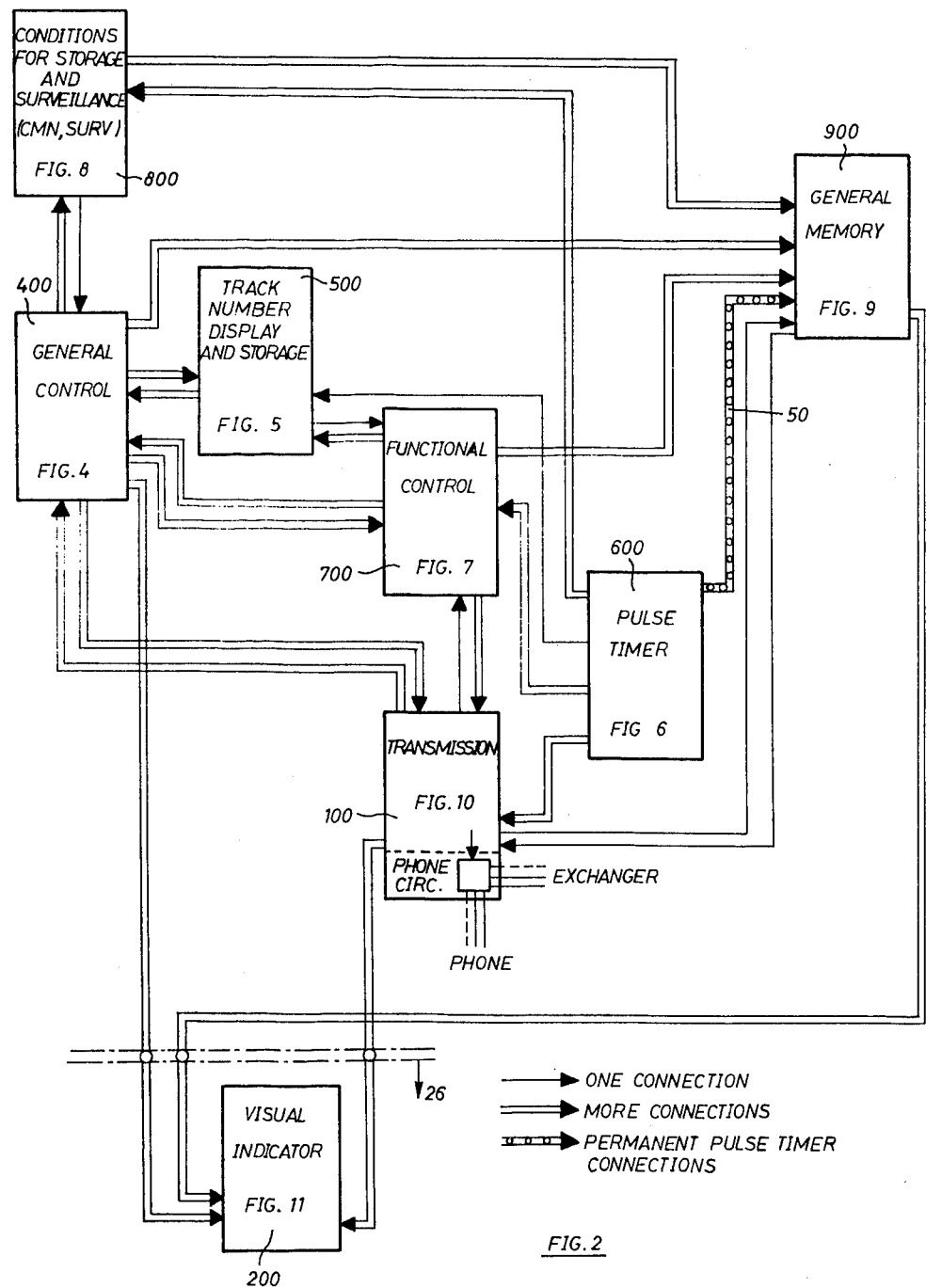

TRACK CHANGE

CALL

FAST FORWAD

TWO CYCLES TRANSMISSION

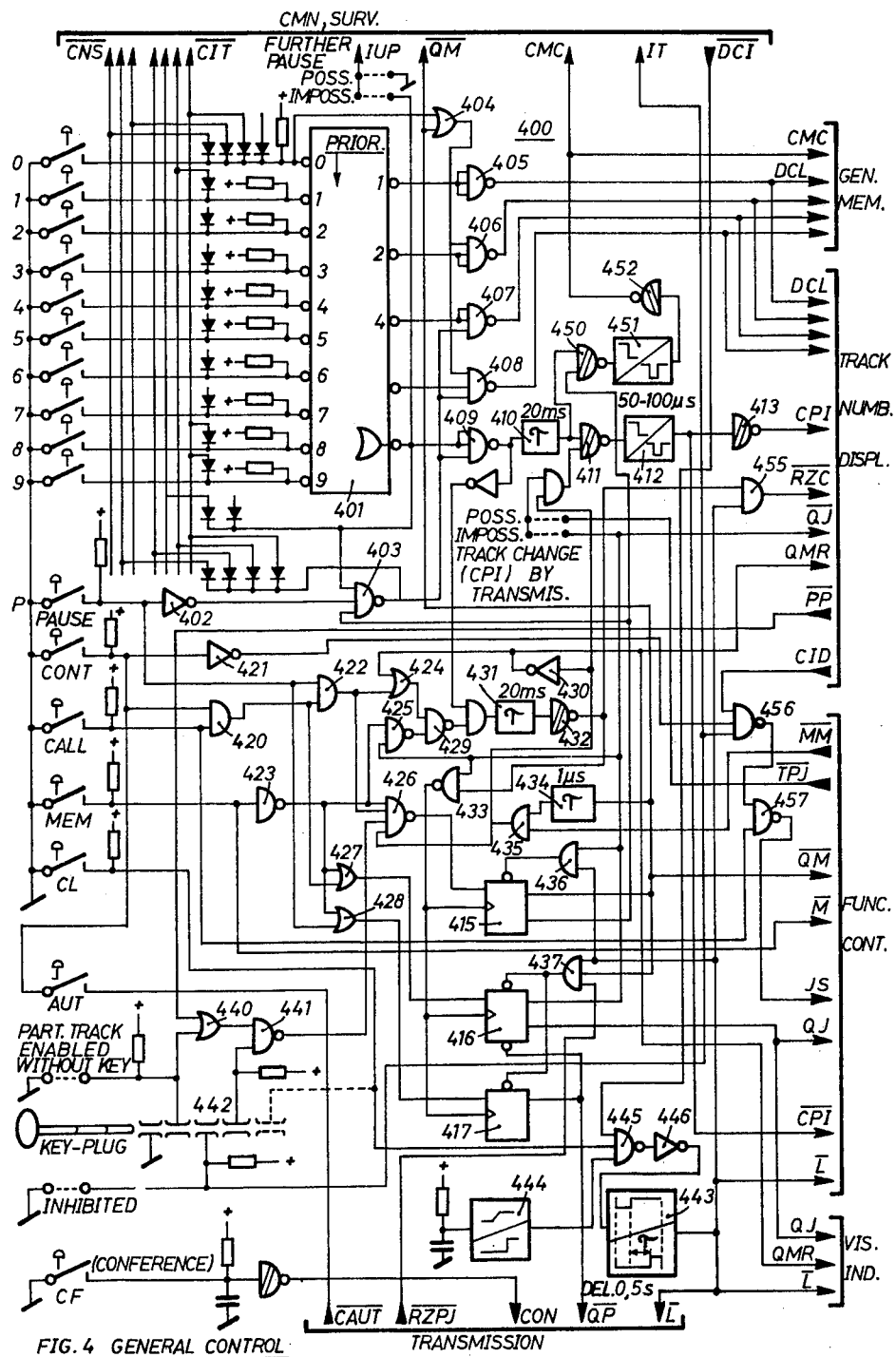
FIG.4 GENERAL CONTROL

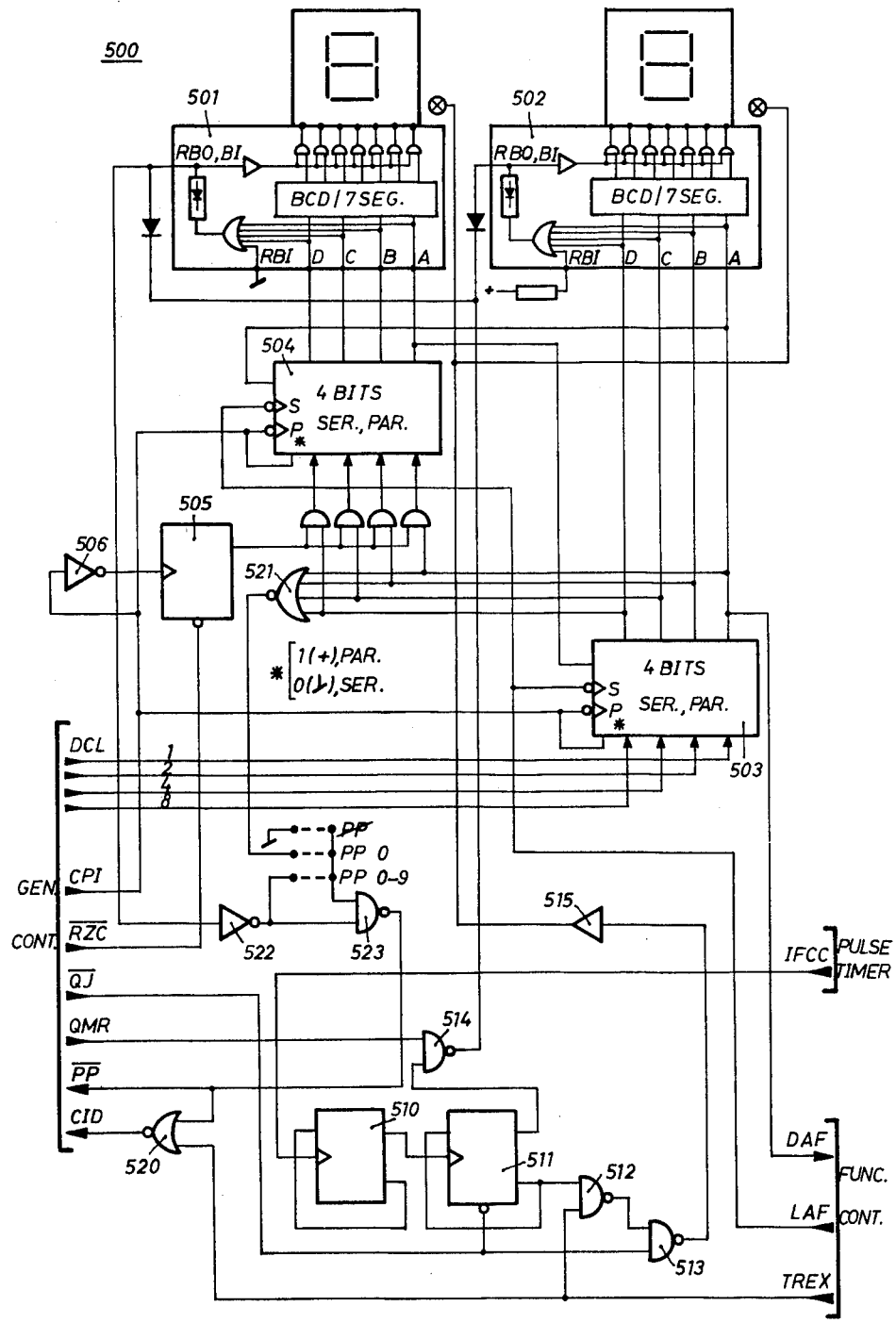
FIG. 5 TRACK NUMBER DISPLAY AND STORAGE

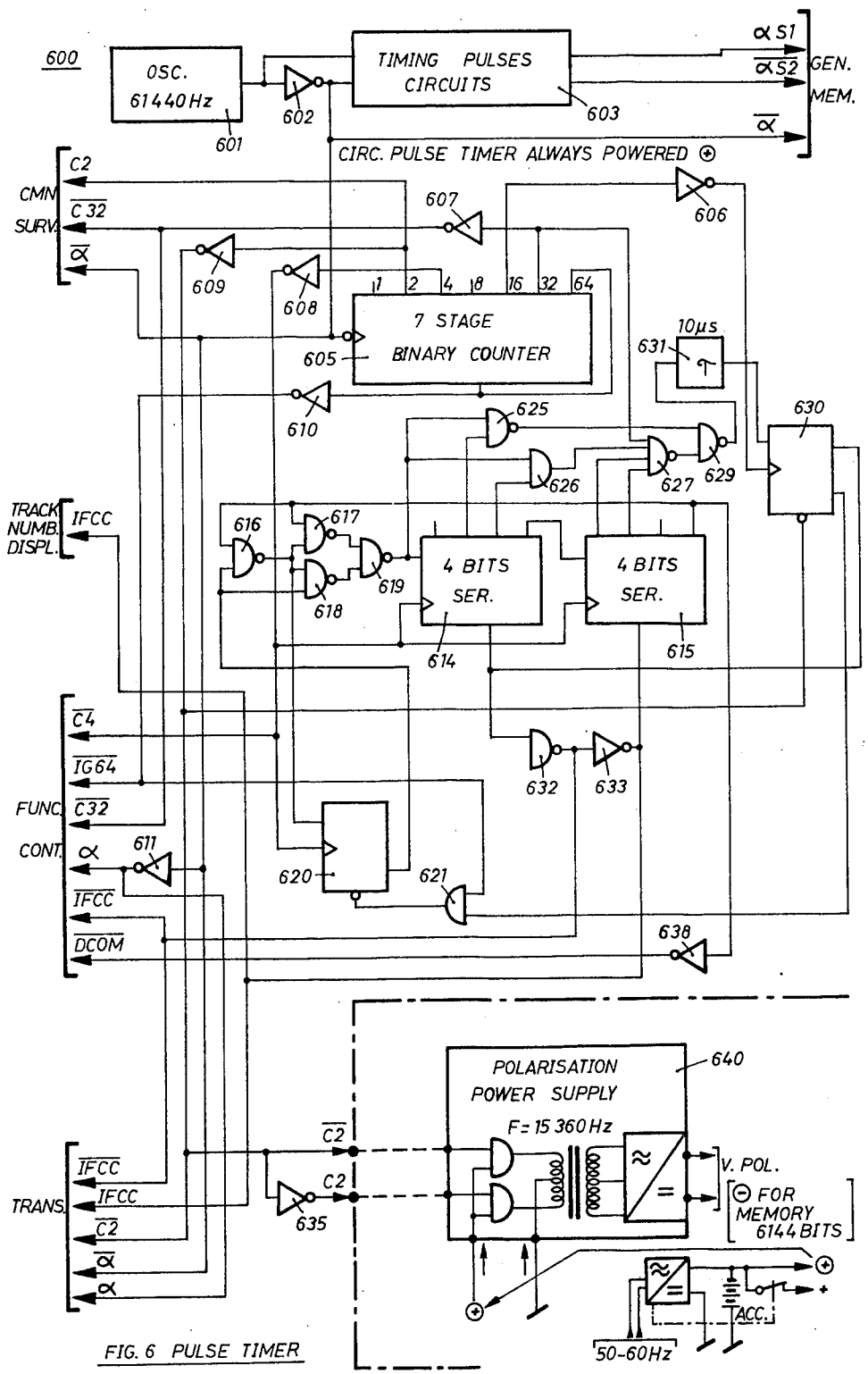
FIG. 6 PULSE TIMER

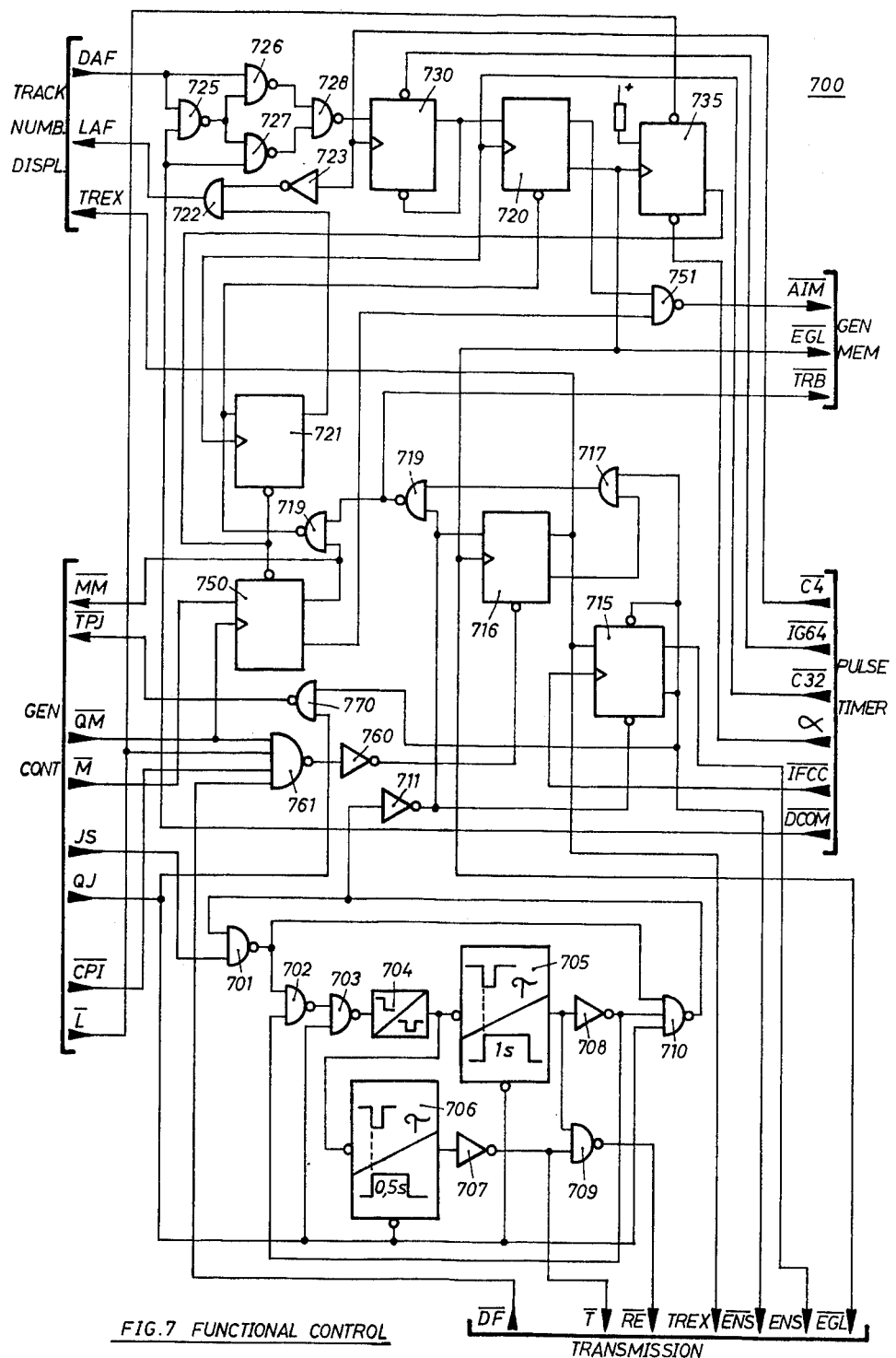
FIG.7 FUNCTIONAL CONTROL
TRANSMISSION

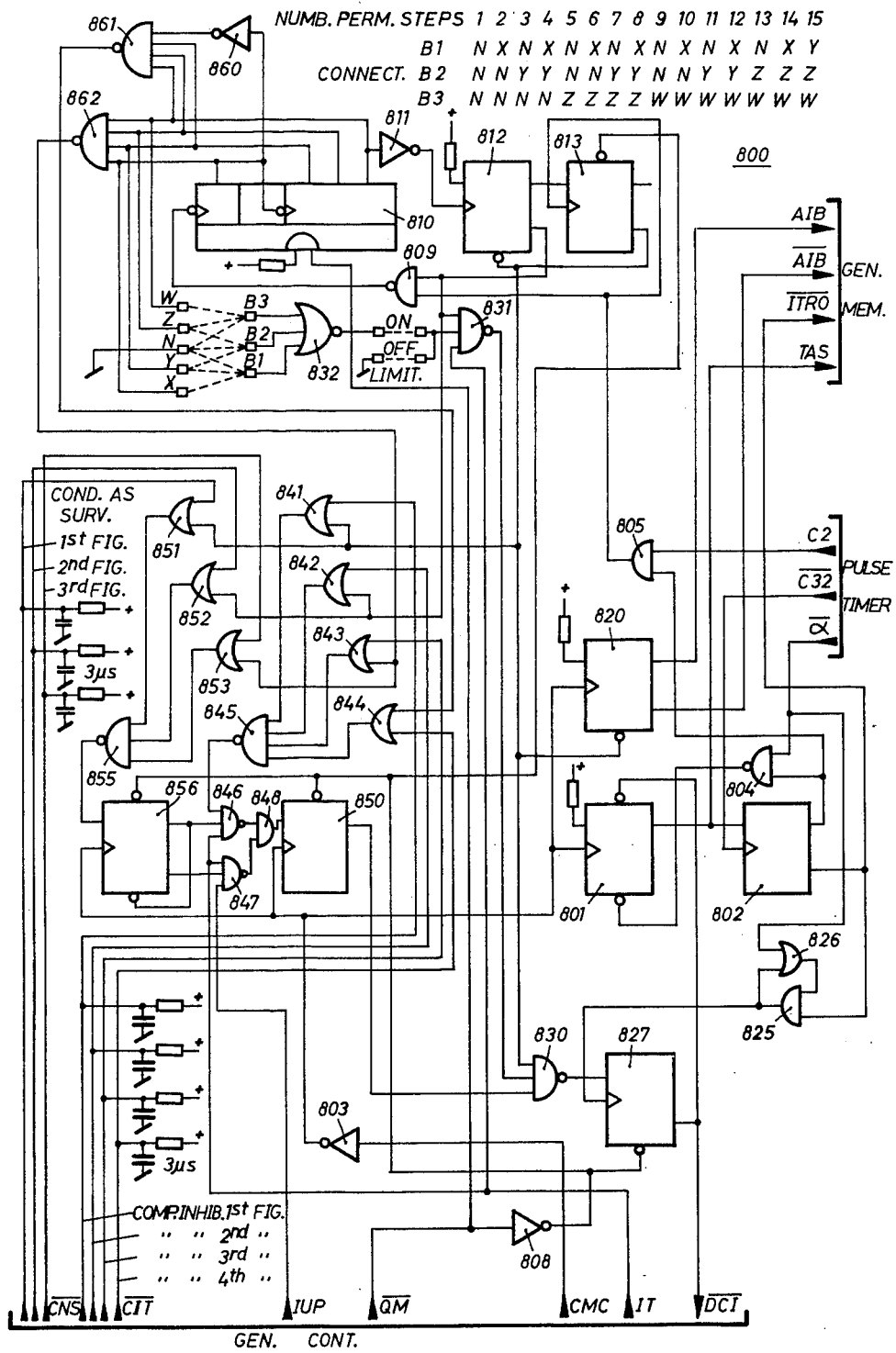
FIG. 8 CONDITIONS FOR STORAGE AND SURVEILLANCE (CMN SURV)

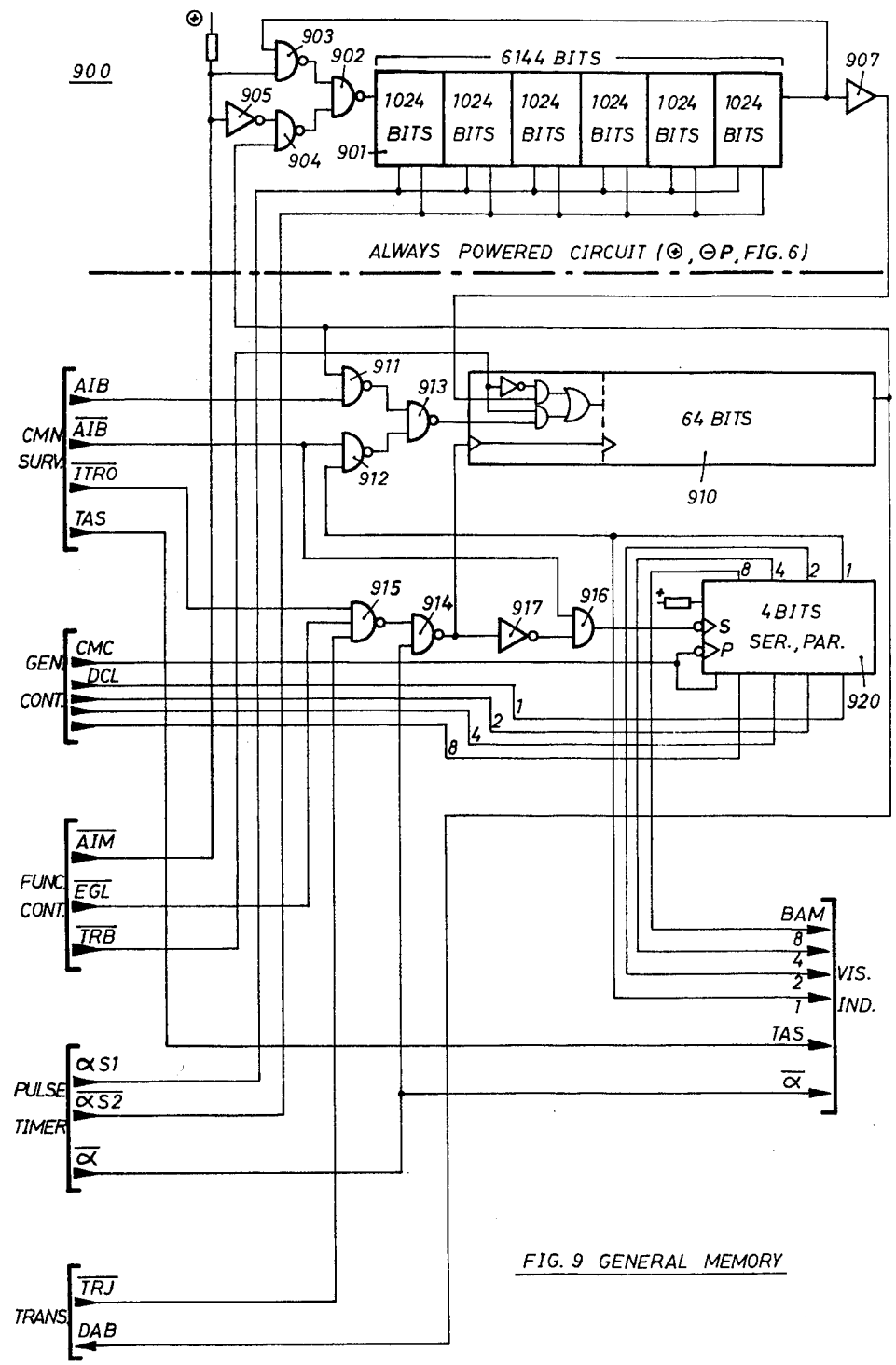
FIG. 9 GENERAL MEMORY

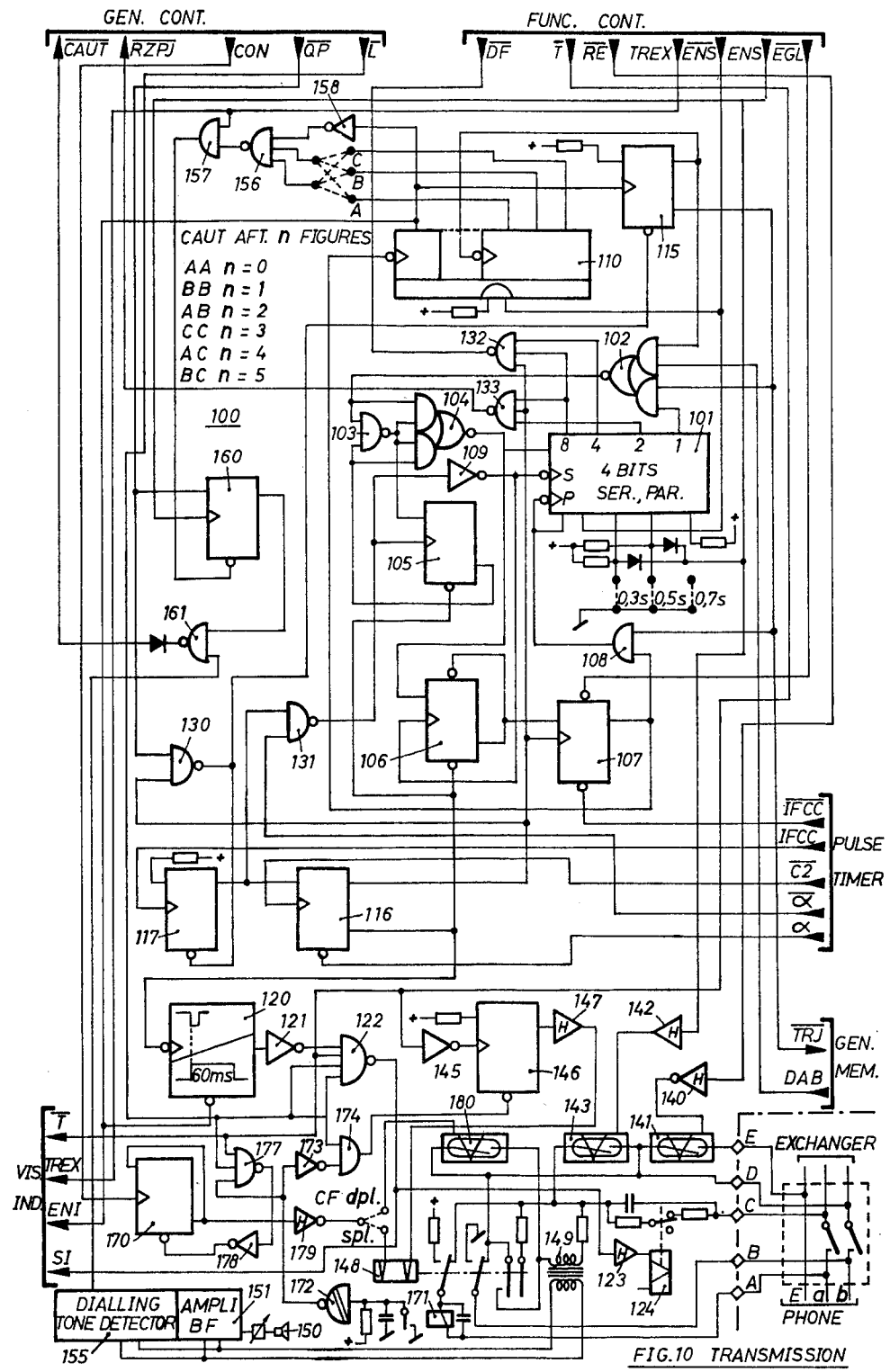
FIG.10 TRANSMISSION

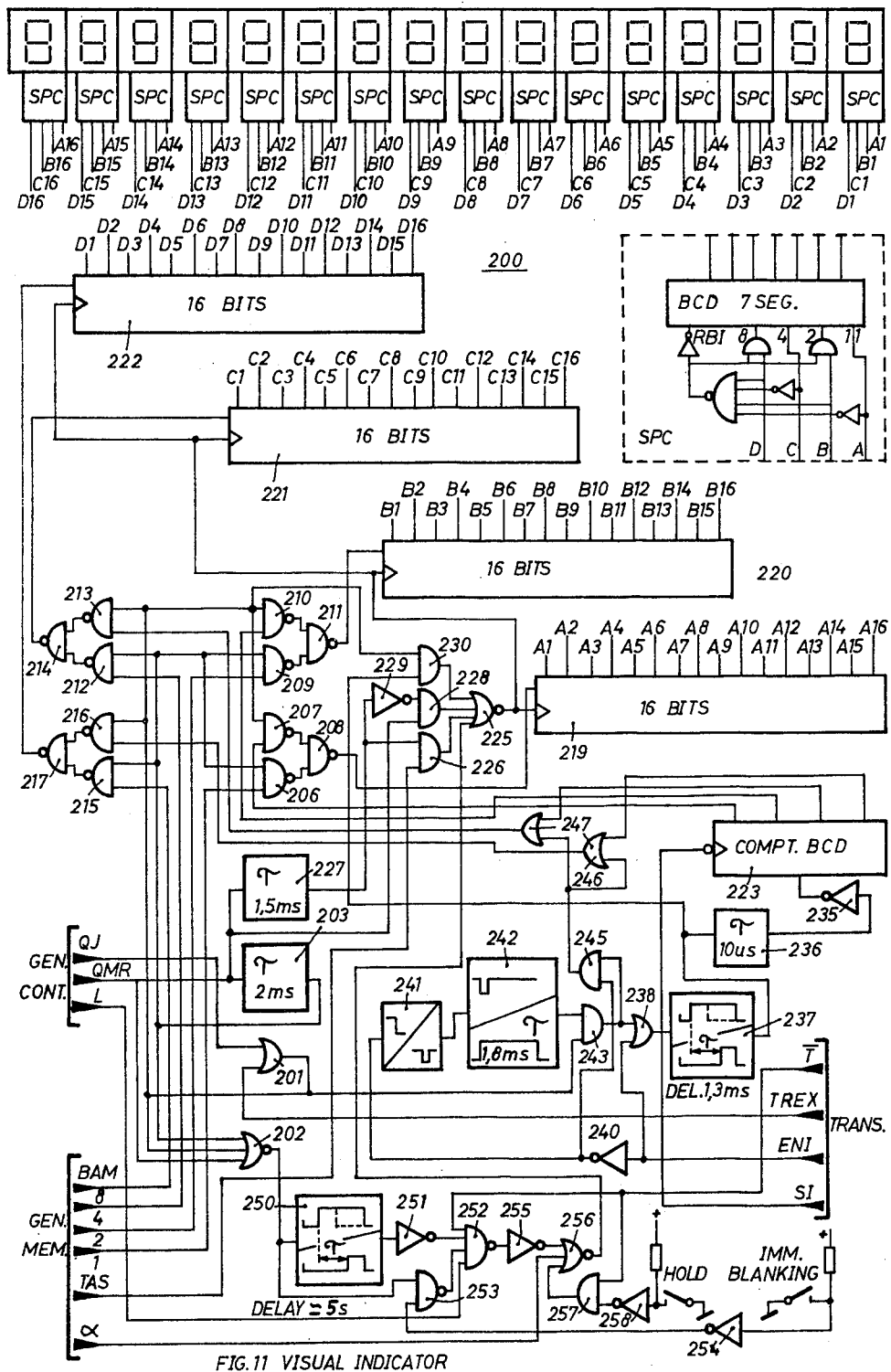
FIG.11 VISUAL INDICATOR

ELECTRONIC APPARATUS FOR THE PERMANENT STORAGE AND AUTOMATIC DIALING OF TELEPHONE NUMBERS

The present invention concerns an electronic apparatus for the permanent storage and automatic dialing of telephone numbers intended to be jointly connected to a telephone set comprising:

a memorizing circuit made up of a plurality of tracks each including a plurality of storage sections each of which is adapted to store a digital data in the form of a particular condition taken among several possible conditions, the latter representing at least all the different numbers capable of being included in telephone numbers, respectively, preparation and storage control means arranged to adequately enter said digital data into said storage sections of a track of the storage circuit, means for the sequential reading of digital data stored in said storage sections of a said track, these reading means taking up these data in the order in which the sections storing them follow one another, and means for dialing numbers operating in relation with said reading means and being provided with a device for transmitting telephone numbers that they are arranged to actuate in a way as to cause it to dial the numbers represented by said digital data successively read by said reading means in said storage sections of a track, and a command keyboard provided with members the keying of which permits the selection of a said track, identified by a display, and the optional actuation with this track of said preparation and storage control means and of said means for the sequential reading and for the dialing of the numbers.

Such an apparatus used in conjunction with a telephone set permits the storage of telephone numbers comprising a large amount of digits and enables them to be dialed automatically upon simple push-button manipulation involving simply the choice of a track by the actuation of one or two keys (for a number of tracks not exceeding 100) then pressing on a command key for the dialing of the number. In most enterprises, offices, executive offices, etc., persons having to phone often have to call the same numbers (regular dealers, clients, business friends, etc.,) and it is ascertained that the great majority of telephone calls concentrate around less than a hundred different numbers. These numbers, on the other hand, are often numbers with six digits, nine digits and even many more if it has to do with calls abroad. If, therefore, all these numbers which are frequently called are stored in an apparatus and can be determined by a simple conventional number of one or two digits (on occasion three digits for a number of tracks greater than 100), there will result a great facilitation of work. An apparatus of the type previously described is precisely intended to permit such facilitation as well as to provide certain other advantages which will be mentioned further on.

An apparatus of the kind in question is already known but is electro-mechanical and not electronic. Although this known apparatus may render considerable service, it is subject to certain drawbacks particularly in view of the want or certain improvements which in any case would not be possible, without being too cumbersome, in an electro-mechanical apparatus. A disadvantage of this known electro-mechanical apparatus consists of an only restricted possibility of using, in a rational and advantagous way, all the storage capacity which effectively exists. As a matter of fact, while the tracks, in order to be able to store very long telephone numbers, for example, for international traffic, should permit the storing of a great amount of digits (in the case of the prior apparatus in question, 24 digits), most of the numbers which are stored on these tracks only comprise six or nine digits. There indeed exists the possibility of entering on the second part of the track a second telephone number but it is established that in the prior apparatus in question this second number can only be retrieved after a complete "scanning" of the first number on the track which involves a very considerable loss of time. Thus, in this apparatus, the second, even the third numbers of a track are as a rule reserved for the second and possibly third numbers of a same enterprise, this second or third number being then dialed just after the scanning of the first number has been answered by the receiving of the "busy" signal. In this prior known apparatus, a changing of track by which it is desired to return to the beginning of another track is not possible either without a previous process which causes the track support (in this case a drum) to return to its initial position if it is in another position, this frequently occurs, for example, after unsuccessful dialing of the first number of a track. In this prior electro-mechanical apparatus, the inconvenience of having to lift the receiver of a telephone set before instigating dialing of a number was also determined. It has also proved complicated, if not impossible, with this electro-mechanical apparatus, to effect the dialing of a number "by combination", this would be particularly worth while, for example, in the case of a hotel switchboard, different area codes of foreign cities could be permanently stored on track sections and the local number of these cities could be recorded whenever necessary on another "traffic" track (where these occasional numbers would be stored for a short time only).

A problem, whose solution should have been found in such an apparatus but which has not yet in any case been resolved in the prior known devices of the type in question, particularly arises in large enterprises or administrative offices in which the need to be able to telephone clients, dealers or business associates residing all over the world requires that no restrictions at all in the possibilities of dialing numbers be imposed by the internal extensions themselves via the switchboard. As a result, as statistics have proved, very high expenses arise for a good number of enterprises due to private or superfluous telephone calls made by certain persons who abuse the telephone facilities at the expense of the business. It would be advisable, technically, to allow all possibility of making useful calls all over the world, at the same time restricting the possibilities of making unnecessary calls from the office, at least to a reasonable extent, for example, by not permitting private calls outside the business or outside the local region. This problem has not yet been solved and a technically developed apparatus of the type in question should, if not ensure a solution to this problem in all its possible embodiments (which do not occur for all telephone users), at least permit and encourage in its basic arrangement technical measures suitable to furnish such a solution.

Certain other devices are also known, some electronic, which permit the dialing of telephone numbers instead of by the user. However, the devices known at present are simple dialing devices and not devices for the permanent storage of telephone numbers and they often comprise devices for repeating the call in the case of a busy signal, being limited mainly to this function, excluding a permanent storage function which involves a much more complicated construction. With dialing devices known to date, the user must himself completely feed into the apparatus the entire data consisting of the telephone number to be called, this entry being done either with the aid of a dial of the telephone set or with the aid of a keyboard made up of at least ten numerical keys or with the aid of a punch card, or a card bearing data by a similar means, which should firstly be found in a card file then inserted into the apparatus where it is read and if necessary reread until the call of the number which it bears takes place (or until the user decides to cancel the call), then finally removed from the apparatus so that the latter can be used to call another number. Such a punch card device or similar element cannot be compared with an internal storage because such a card is an external storage member which should be put away and taken care of outside the apparatus and handled each time the data which it bears should be used. There is a great risk that such an external storage member is mislaid or lost, its production or reproduction, following such a loss, necessitating however a process which is not very simple compared to a recording in a storage unit within an apparatus with the aid of keys of a keyboard.

Thus, known devices for the simple dialing of numbers require, in one form of another, a relatively complicated handling for the complete entry of the number data and when these devices comprise certain storage elements these latter are only elements for a temporary storage of low capacity intended for the repetition of the call in the case of a busy signal. Even a known apparatus which allows temporary storage up to five telephone numbers of which the call has not yet been completed should not be compared with a permanent storage apparatus inasmuch as the memorized numbers, as a result of unsuccessful calls, are repeated in turn without the user being able, for example, to select one to be dialed immediately, while retaining the others in storage "for another time" and without the apparatus continuing to dial them. In any case, it is not possible with such an apparatus for simple dialing and repetition to store internally and permanently a telephone number of which the last dialing has ended in the establishment of a connection, no means, moreover, being provided for ordering a new dialing of a number which has not yet previously been the object of an unsuccessfully attempted call.

These devices, therefore, should not be compared with an electronic apparatus for the permanent storage and automatic dialing of telephone numbers of the type previously described and, besides, such a comparison would very soon show that these devices do not at all furnish a basis for the solution of the aforementioned problem neither do they furnish a solution for eliminating the drawbacks of the first prior apparatus considered; operating electro-mechanically.

The aim of the present invention is to provide an electronic apparatus for the permanent storage and automatic dialing of telephone numbers which does not have the drawbacks of similar devices existing and which provides a basic arrangement from which suitable technical measures can be taken for providing a solution to the aforementioned problem relating to adequate restrictions which should be provided for the possibilities of dialing unnecessary numbers but in a way as not to hinder any possibilities of dialing necessary numbers.

According to the invention, the electronic apparatus for the permanent storage and automatic dialing of telephone numbers, of the previously defined type, comprises the following features:

the said storage circuit comprises, in each storage section of said track, storage means arranged to permit the storage of a said digital data in the form of a particular condition taken among a number of possible conditions greater than the amount of all the different numbers capable of being included in telephone numbers in such a way as at least one possible condition exists for representing an indication other than one of the said numbers and of which at least one consists of an auxiliary indication of a pause order, the said members of the keyboard comprise means for the storing of a pause order to control, by manipulating at least one said member and in cooperation with the said preparation and storage control means, the storage, in a said storage section of a selected track, of a digital data consisting of the particular condition which represents a pause order, the said members of the keyboard comprise command means for rapid advance within a track for causing, upon manipulation of at least one said member, the actuation of said sequential reading means in the selected track until a detection by these means of a pause order indication at a speed sufficiently high to permit the successive reading of all the digital data of the track in less than one second and without actuating said dialing means for transmitting digits of telephone numbers, the said keyboard members comprise means for the commanding of a new dialing of a number and means for commanding the continuation of the dialing of a number, which cause, upon different manipulations of the said members, the actuation of said means for dialing a number at a rate required for the transmission of numbers of a telephone call and in relation with said reading means, said means for the commanding of a new dialing of a number causing, in addition, the pre-transmission of an impulse of restoring and then reclaiming a telephone line, and said reading means being arranged to stop the data reading and to cause the transmission of the corresponding numbers to stop at the time of the detection of a pause order and to cause the reading and the corresponding transmission to begin, when said manipulations for the commanding of a new dialing and for the commanding of the continuation of the dialing take place, from the first storage section which, in the selected track, stores a digital data remaining still unread since the selection of that track.

In an embodiment which is particularly advantageous because it comprises elements providing a solution to the problem raised, this apparatus is further characterized in that the said preparation and storage control means comprise discriminatory means for the selected tracks which only authorize the storing of new telephone numbers, without the use of a total storage authorization code-key, on certain special tracks, these preparation and storage control means also comprising digit number limiting means inhibitable with the aid of the said code-key which prohibit the storage in a said special track of a number comprising more than a certain amount of digits.

In another embodiment, also advantageous because it also comprises components adapted to provide a solution to the problem previously raised, the apparatus is also characterized in that the said preparation and storage control means comprise means for the prohibiting of particular numbers, which forbids the storage in a said special track of a number beginning with certain predetermined digits, these means for the prohibiting of particular numbers being counteractable with the aid of said total storage authorization code-key.

These two particular embodiments will be advantageously combined with each other and the apparatus will then advantageously, always with the aim of providing the best solution to the problem previously raised, comprise means for the prohibiting of dialing by combination which cause the pretransmission of a pulse for restoration and then for reclaiming of a line each time the said means for the dialing of numbers are actuated with a said newly selected special track independent of those of said means for commanding a dialing and for commanding the continuation of the dialing which cause this actuation.

Finally, still advantageously and with the same aim, the apparatus could comprise, within said means for the prohibiting of particular numbers, further means for prohibiting of a pause, forbidding the storage of a pause order data in the storage sections of a special track which are subsequent to those intended to receive the data, which, subject to storage prohibition, should not correspond to said predetermined numbers, these means for prohibiting a subsequent pause order being counteractable with the aid of the total storage authorization code-key.

In an economic, particularly advantageous, embodiment, the number of said tracks amount to 96 and each comprises 16 said storage sections. Each storage section is adapted to store a binary coded digital data in the form of one of sixteen binary combination conditions ten of which correspond to the numbers 1 to 10, at least one of which corresponds to the pause order and at least one of those which only comprises identical binary levels corresponds to an absence data signaling a passage beyond the last significant data stored in a track.

The attached drawing illustrates, by way of example, an embodiment of the apparatus according to the invention: in this drawing:

FIG. 1 is a view in perspective of an electronic apparatus for the permanent storage and automatic dialing of telephone numbers, FIG. 2 is a block diagram illustrating the general construction of the apparatus of FIG. 1 in different electronic units, this FIG. 2 also indicating the connections existing between these different units and, moreover, designating these latter, on the one hand, with regard to their denomination and, on the other hand, with regard to the further figure which procides the logical electronic diagrams, FIGS. 3a to 3h are schematic illustrations of different functions and phases of operations which could arise in the apparatus of FIG. 1, the topological arrangement of the different units being the same on these figures 3a to 3h as on FIG. 2, FIG. 4 is a block diagram of a unit for the "general control" visible in FIG. 2, FIG. 5 is block diagram of a unti for the "display and storage of the track number" visible in FIG. 2, FIG. 6 is a block diagram of a unit constituting a "pulse timer" visible in FIG. 3, FIG. 7 is a block diagram of a unit for the "functional control" visible in FIG. 2, FIG. 8 is a block diagram of a unit for the "conditions for storage and surveillance" visible in FIG. 2, FIG. 9 is a block diagram of a unit for the "general memory" visible in FIG. 2, FIG. 10 is a block diagram of a unit constituting the transmission of the composed number of telephoning, this transmission unit being visible in FIG. 2, and FIG. 11 is a block diagram of a unit constituting a "display unit" that is to say a visual indicator of the storage and transmission operations of the apparatus in question, this "display unit" shown in FIG. 11 constituting an optional attachment of the apparatus and being as such shown in FIG. 2 as a disconnectable block situated, from the point of view of data transmission, below the other blocks to which it is connected.

FIG. 1 shows that the electronic apparatus for the permanent storage and automatic dialing of telephone numbers, designated by the general reference numeral 20, seen from the outside has, on its slightly inclined upper surface 21, a keyboard 22 which comprises fifteen keys. Eleven of these keys, situated more to the left, constitute a group 22a of "entry keys" through which the desired indications and data can be entered into the apparatus in order to effect a change of track or in order to effect a storage (functions which will be examined further on). The other keys of the keyboard do not serve for feeding in data but for the control of different functions of the apparatus. Among the eleven entry keys, ten correspond to ten numbers from 0 to 9 and last one, the P key, is an entry key which only serves as such during a storage process for entering a pause order data. In addition to the storage function, this P key serves, as will be seen further on to control a function like the four keys MEM., CL., CONT. and CALL. to the right. The different functions of these keys will be examined further on.

Above the keyboard a window 23 for the number display of the selected track is seen, this display being of two luminous numbers 23a composed of seven segments and permitting the display of a hundred different track numbers, the four last possibilities 96 to 99, however, not being used as the apparatus comprises 96 storage tracks numbered form 0 to 95. The display 23 also comprises two luminous spots 23b, the role of which will be explained further on.

On the front or upper surface of the apparatus a key marked CF is likewise seen disposed at a distance from the other keys as its role only has a remote connection with that of the other keys. As a matter of fact, this key CF serves to switch on and off, depending on the circumstances, a conference system which will be explained further on. Beside this conference key CF, the rectilinear slider 24 of a potentiometer is seen serving to regulate the volume level of a loudspeaker mounted in the apparatus at the upper part of its front surface where slots 25 are made to enable the hearing of this loudspeaker. It will be seen further on that at the time of an automatic dialing of a number by the apparatus this loudspeaker substitutes the telephone receiver which thus need not be unhooked until the person called answers.

Approximately in the middle of the front surface of the apparatus is a unit 26 which constitutes a display subassembly (or visual indicator). In a simpler embodiment, this display unit 26 may be omitted; as a variation, it could also be constituted separately to be placed beside the apparatus to which a multiple connection cable would then connect it up. This display unit or visual indicator 26 shown in the illustration of FIG. 1 in the form of a console comprises a group 27 of sixteen luminous visual fields for numbers according to the principle of the seven segments, these sixteen display fields of small dimensions are of the same quantity as that of the numbers or digital data which, as will be seen further on, can be stored on a track. At the left of the visual group 27, the display unit 26 comprises a slide bar switch 28 on the position of which depends the fact that the display appearing in 27 is maintained or not after termination of the process which has established it. Similarly, the right side of the display unit 26 comprises a slide bar switch 29 which, when the switch 28 does not impose the maintaining of the display, determines the fact that the extinguishing of this display occurs immediately or with a certain delay after the end of the process which has established it.

FIG. 1 also shows, in broken lines, that the back end of the apparatus comprises a slot 32 into which a code-key 33 can be inserted bearing, for example, a marking in the form of a printed circuit 34. It will be seen by examining the functions of the apparatus what the role is of such a code-key, it suffices here to point out that numerous code-key forms may be provided and that in one simple embodiment the code-key could also consist of a simple metallic rod insertable into a circular opening. The principle of such electric code-keys, and particularly of electric code-keys in the form of a printed circuit, is well known as such.

It is likewise seen in FIG. 1 that the front end of the apparatus comprises a relatively wide slot 30 intended to receive a card which can be the list of numbers recorded on the different tracks and of subscribers answering to these numbers. Two grooves 31 in the part of the housing situated above the slot 30 facilitates the grasping of such a card supposedly inserted in the slot 30. Finally in FIG. 1 a switch is seen, to the right of the key CONT., of the push-button type "press on/press off" which is only foreseen when the apparatus is provided, as in the embodiment which will be more specifically described, with dial tone detector means and means for the automatic continuation of dialing upon receiving the dial tone. These latter means can be put into action and put out of action with the aid of the push-button switch AUT.

It is likewise to be noted that the different keys and the switch which appear on the front surface of the apparatus and which are visible in FIG. 1 bear inscriptions which designate them for the user and which are also marked in FIG. 1. For reasons of convenience, reference signs will be used identical to those inscriptions made up of a number or one or more capital letters to designate these keys and switch in all the figures.

It is advisable now to examine briefly the different functions of the apparatus as they appear from the outside to the user. Only the main point of these functions will be considered here, the details will be seen in conjunction with the examination of the particular circuits which allow their realization.

As has been noted, the apparatus comprises 96 tracks on which telephone numbers may be stored and from which these telephone numbers may then be retrieved to be automatically dialed, at the same time remaining stored in the apparatus. Each track comprises 16 storage sections each capable of storing a digital data, be it an incoming digit in a number or also, as will be seen, a pause order information.

In order to store a telephone number in a track, this track must first of all be selected which is done by pressing the entry keys corresponding to the digits of the track number, for example 2 and 6 for the track 26, or merely 8 for track 8. The number of the selected track appears luminously in the display window 23. It must be noted right away that the tracks are, in the majority even to their entirety, guarded against undesired erasing in that a new telephone number can be stored there (which will erase the old number which has been stored there) only after the insertion of a code-key as, for example, the code-key 33 visible in FIG. 1. It is possible, by a simple modification of the internal wiring, to adjust the apparatus so that there are only ten tracks, or one single track, or no tracks which are accessible for a storage without the aid of a code-key. Moreover, the tracks accessible for a storage without the aid of a code-key may be burdened with limitations or restrictions with regard to the amount of digits of a storable number or also with regard to the type of number (for example, long-distance numbers beginning with 0, forbidden). These limitations and restrictions may also be prevented with the aid of a code-key, be it that which allows the storage in any track, or another code-key solely suited to cancel the restrictions and limitations on the tracks accessible without a code-key for a storage, these tracks being called, for convenience sake special tracks.

If, with or without the aid of a code-key, there is a selected track on which a storage may be made, this storage will be effected first of all by pressing on the key MEM which will cause the track number indication to blink in the window 23. From this moment, the number can be composed with the aid of the entry keys 0 to 9 being understood that the apparatus is equipped for transforming the data 0 to a data 10 in accordance with a telephone dial. If, for one reason or another, it is desired that the dialing of the number be subjected to an intermediate pause, a pause order data may be entered at the desired place on the track by pressing the key P. If the apparatus is provided with a display unit or visual indicator 26, the digits successively chosen for composing the number are indicated in the fields 27 where they appear in a manner similar to the numbers fed into a pocket calculating machine. When the desired number has thus been composed, a second pressure on the key MEM causes the entry of the complete number, up to then stored in a buffer-memory, onto the selected track. If, accidently, a number of more than sixteen digits is composed, or if, in a special track, a number is composed having more digits than permitted or a number commencing with a forbidden digit, the apparatus automatically returns to zero without storage occurring in the track, similar to what happens if the key CL (liberation) is pressed. It is also possible to store several numbers on a single track or, if need be, parts of numbers, area codes, etc., separated by a pause. The apparatus comprises, as a matter of fact, improvements which will allow dialing either the first or the second (or possibly the third) of these numbers without any loss of time at all.

For the dialing of a number recorded on the track, one begins by choosing the desired track in the aforementioned manner, and, for causing the line call and the automatic dialing of the number stored on this track, the key CALL is pressed. This process, to begin with, causes the engagement of the telephone line without it being necessary to unhook the receiver of the adjoining telephone. Then, the digits stored on the selected track are successively dialed by a transmission device which sends the corresponding impulses onto the telephone line until a pause data is detected or until all the digits stored on the track have been dialed. Generally the track will only contain less than sixteen digits; as soon as the apparatus establishes that all the storage sections containing a significant data (digit or pause) have been played, the circuits will be reset again, the line naturally being retained and the answer of the person called will be heard in the loudspeaker. As soon as the person called has answered, the receiver should be unhooked in order to talk to him. It must be noted that the display window 23 comprises two spots 23b which are normally extinguished while the digits 23a are fixedly lit when neither a storage nor a call and a dialing of numbers is instigated. When a track is played, these two spots 23b fixedly light up and they start to blink if, during the course of the playing of a track, a pause signal causes the stopping of the dialing of the number. At the moment when the key CALL is pressed, the means for the dialing of the numbers prepares to enter into action but they do not begin to dial a number before the key CALL has been released. This permits waiting for the dial tone to be heard in the loudspeaker. If the key CALL is only briefly pressed, there is in any case a time lag of approximately one second before the dialing of the number begins which is generally more than sufficient for the dial tone to appear.

It is also possible, for example, following a 0 for leaving the private exchange system, to store a pause after this zero, the result will be that the dialing will not continue, the dial tone may thus be waited for as long as necessary. If the AUT switch is switched on and if the apparatus is provided with the desired equipment, the appearance of the dial tone will be detected and will automatically cause the continuation of the dialing of the number. However, one must be able to switch off the AUT switch in certain circumstances, for example, if a very loud background noise disturbs the functioning of the dial tone detector and falsely shows the presence of this tone. The continuation of the dialing of the number will then be instructed by a pressure on the key CONT. This key will also be used if the receiver has been unhooked previous to the instruction for the automatic dialing of the number. It would also be possible and advantageous, for example, for a hotel switchboard to store the area code of a city on a track, like, for example, Paris or Munich, so that only the local number searched for would then have to be composed. For this, the local number would be temporarily stored on a track accessible without a code-key and the call would be effected by first of all playing the area code which would be followed by a pause and then, after having changed the track, playing the local number with the aid of the CONT key. It could be possible, for example, to record several area codes on one track separated by a pause. It is here that the particular function of the key P intervenes in the process for the dialing of the numbers. As a matter of fact, if it is desired to immediately attain the second area code, the key CONT could be pressed which would cause the play of the first area code without calling in a way that the second area code would then be attained. This would, however, take a certain time. By pressing the key P instead of the key CONT, the scanning of the whole first part of the track can be instigated up to the pause signal during a period of time which practically does not exceed a thousandth of a second. That is to say that the beginning of the second number (or of the second area code) is reached instantaneously. From then on a pressure on the key CALL will bring about the dialing of the number recorded after the pause data. The apparatus thus allows the combination of parts of numbers and sections of tracks in a very great number of ways and without any loss of time, which is very important.

It will be seen by studying the details of the circuits that it is also possible with the apparatus, for example, within the framework of a large enterprise, to only authorize the occasional storage on a special track accessible without authorization code-key of numbers which do not begin, for example, with 00 or 08 or 09, that is to say, occasional calls following an occasional storage could be authorized only on a part of the long-distance lines of a country with the exception of those of which the area code commences with 08 and 09, calls outside the country commencing with 00 being also impossible in this manner. It is clear that with these conditions the dial of the adjoining telephone set should be blocked.

As soon as a number is dialed by the transmission to the line of impulses corresponding to its digits, the number of these impulses comprised in each pulse train, that is to say the digit transmitted to the telephone line is visible in the display unit 26 which enables, if the occasion arises, a control. If the switch 28 is pulled down, the indications seen in the display sub-assembly 26 are retained even after the transmission process which has established them; however, at the time of a call, the occupying of a line which precedes the dialing of the number erases, in any case, the indication which was seen previously. The same does not occur in the storage process: as a matter of fact, in this case if an old indication was maintained in the display unit it would only disappear progressively as the new one appears. In addition, even before the new indication appears, the old indication will have jumped already one space forward in order to establish a free field between the old indication which would disappear progressively and the new one which progressively establishes itself.

The key CF for the setting up of the conference system permits, once the receiver has been unhooked, the appearance of the line modulation in the loudspeaker incorporated in the apparatus. Depending on the circumstances, this loudspeaker will be connected in parallel with the microphone and the earphone part of the receiver, or it will be connected to the line alone, microphone and receiver being disconnected. These two possibilities can be chosen internally by a very simple wiring modification, the chosen solution will depend on the requirements of the telephone administration of the country where the apparatus is in service. If the telephone administration accepts the two possibilities, a switch could be foreseen, accessible from the outside, to produce the simple wire changing which establishes the conference system either in one way or in the other.

Numerous measures are further taken to permit or not to permit certain manipulations or certain interferences of manipulations, these measures will be considered in connection with the explanations relative to the electronic and logic means which concretely establish the multiple possibilities of the diverse functions of the apparatus.

FIG. 2 shows how the different electronic and logic units of the device are distributed and it indicates what the figures of the drawing are which provide the diagram of each of these units. These figures are FIGS. 4 to 11 and it is to be noted right away that the components which are found there are designated by reference numbers of three digits, the first of which corresponds to that of the figure for the FIGS. 4 to 9, this first digit being 1 for FIG. 10 and 2 for FIG. 11.

The different connections between the electronic units of the apparatus are represented in FIG. 2 by a double line if a plurality of data is transmitted from one unit to the other, that is to say, if there is a plurality of connections (or a multiple connection), and by a single line if a single data is transmitted from one unit to the other, that is to say, if there is one connection. It is to be noted that the connection 50 which leads from the pulse timing unit 600, FIG. 6, to the general storage 900, FIG. 9, is a connection which transmits clock pulses in an absolutely permanent way, the pulse timing unit 600 and the part of the storage 900 which constitutes at least the memory of the 96 storage tracks being always power supplied, even in the case of a breakdown of the main power network, by the intermediary of a buffer-accumulator. The general control unit 400, the details of which are represented in FIG. 4, encompasses the keyboard, both the entry keys and the function controlling keys, it also comprises the conference key CF as well as all the logic circuits which are necessary for establishing mutual interlockings between the different commands in order to establish an order of priority between the input keys and in a general manner to ensure that all the commands be transmitted correctly, and that even in the case of incorrect manipulation, as, for example, when an input key for a changing of track is not yet released at the moment when the storage control key MEM is actuated, no disturbing or untimely consequences can result, like, for example, the storage of a wrong number because it contains as first digit that whose key had been previously manipulated for a change of track, or like, for example, the storage of a number in the wrong track as a result of prematurely setting in action keys intended for the next change of track. The general control unit also comprises key circuits which inhibit the restriction or limitations capable of being fed into the apparatus, and it also comprises elements determining the functional variations possible with the aid of wiring elements arranged in a certain manner or another according to what is desired for these functions (for example, the existence or non existence of limitations, determination of forbidden numbers, etc.).

The display and storage of the track number unit 500, the details of which are represented in FIG. 5, comprises means for data presentation in the window 23 as well as auxiliary circuits to condition this display, rendering it fixed, or blinking or partially blinking, etc. In this unit 500 register elements are found which store data representative of the selected track number so as to furnish at the desired moment the information in order to enable the finding of this track in the storage unit again.

The unit 600 which constitutes the pulse timer and whose detailed diagram is represented in FIG. 6 comprises all the elements which permanently function always in an identical manner, that is to say, the pulse formers, the dividers and the elements which, in function with the permanent circulation of the data elements in the general storage unit, establish permanently the identification of the track in the process of passing through the output of this storage unit, so as to permit the flying collection of this data at the instant the circulation of the entire data makes it pass to the location where it can be accessed. As has been stated, the pulse timer is always supplied with power, if need be, with the aid of an accumulator, because a pulse timer supply breakdown as well as a supply breakdown of the general storage part where the entire stored data permanently circulates would have as effect the loss of stored data.

The function control unit 700, the detailed diagram of which is represented in FIG. 7, comprises all the circuit components necessary to order the sequence of operations for the functions of storage, of dialing of numbers, of rapid advance on the track (scanning the first part of the track in less than a thousandth of a second), etc... . It is also the functional control that effects the comparison test between the selected track number data supplied by the data presentation unit 500 and the track number data which is in the course of passing (or which will be the next to pass) to the reading location of the data of the permanent general memory. In connection with this test, the functional control commands the transfers between a buffer-memory and the general memory, either in one direction or in the other depending on whether it has to do with a storage or a dialing of numbers, and, in the latter case, the functional control adequately conditions the circuit elements charged with transmitting the pulse trains which compose the number to be sent on the telephone line.

The conditions for storage and surveillance unit 800 contains circuits which order and monitor the temporary placing in a buffer-memory numbers desired stored in the selected track at the time of a storage process. It is in this unit 800 that components are found which test the conformity or nonconformity of the number which is desired fed on the track, taking into account possible limitations or restrictions imposed on a storage on this track. This unit 800 also comprises means for establishing at will, with the aid of a very simple wiring modification, the number of digits which will be admitted to be stored on one of the tracks, call special tracks, taking into account the presence or the absence (ascertained by the general control unit) of a code-key inhibiting this restrictive measure. This conditions for storage and surveillance unit 800 constitutes, in a way, the filter, the preparation means for the introduction of new data into a track of the permanent general memory.

The unit 900 which constitutes the general memory comprises in fact the entire permanent memory of all the tracks as well as a buffer-memory cooperating with this permanent memory as well as a memory for a single digit of sixteen possibilities (four bits) which is used for entering the data in the buffer-memory in connection with data arriving from the keyboard and under the surveillance of the conditions for storage and surveillance unit 800. The general memory unit 900 permanently receives the pulse data which is necessary for it and it also furnishes, upon individual request from the transmission unit, the data drawn from the storage which this unit needs in order to process the pulse trains to be transmitted.

The unit 100 constituting the transmission arrangement and of which the diagram is shown in FIG. 10 comprises all the necessary components to process and form the impulses to be sent on the telephone line, this operation being affected under the control of the functional control unit and according to the indications furnished by the general memory. The transmission unit 100 also comprises all the circuits galvanicly separated by relay means which are connected with the telephone system. These circuits comprise, other than different relays intended to reproduce the functions which normally take place in a telephone, means for collecting accoustic data for the loudspeaker and the dial tone detector, these latter being also functionally included in the transmission unit. The potentiometer for regulating the volume as well as components conditioning the conference system are also comprised in this part of the unit 100 serving for the transmission at the time of the automatic dialing of a telephone number.

Finally, the unit 200 which constitutes the display the detailed diagram of which is shown in FIG. 11, comprises the electronic components included in the sub-assembly designated on the outside by the reference number 26 in FIG. 1. This display unit 200 only receives information and does not furnish any, at least electronically. As the broken lines drawn in FIG. 2 above the unit 200 show, this latter may be detachable and its removal or its suppression does not alter the functioning of the other units as they receive no electronic data at all from this display unit 200. The latter comprises components arranged to discriminate and order data which enter in the buffer-memory of the unit 900 during a storage operation, or which are processed by the circuit 100 in order to be transmitted onto the telephone line during a transmission operation (or dialing operation). The unit 200 then processes and shifts in the desired manner the information elements intended to energize the visual indicating fields 27 in a way as to cause them to furnish the indications desired in accordance with what has been previously explained regarding this.

FIGS. 3a to 3h, are, on the whole, flow diagrams giving details of how the different units 400 to 900 and 100 and 200 cooperate with each other to carry out the different functions already briefly explained. In these figures, arrows indicate the tracking of data, the designation of this data, conforming to what appears on the detailed diagrams, being marked along side these arrows. In fact, these FIGS. 3a to 3h speak for themselves and it is not necessary to devote any specific explanations to them, they will better serve if anything, to a certain measure, to guide the detailed study of the different functions on the basis of the diagrams from FIG. 4 onward and also to crosscheck considerations and established facts which could be made when examining the different parts of the detailed diagrams of the different units of the apparatus.

Figure 3A:
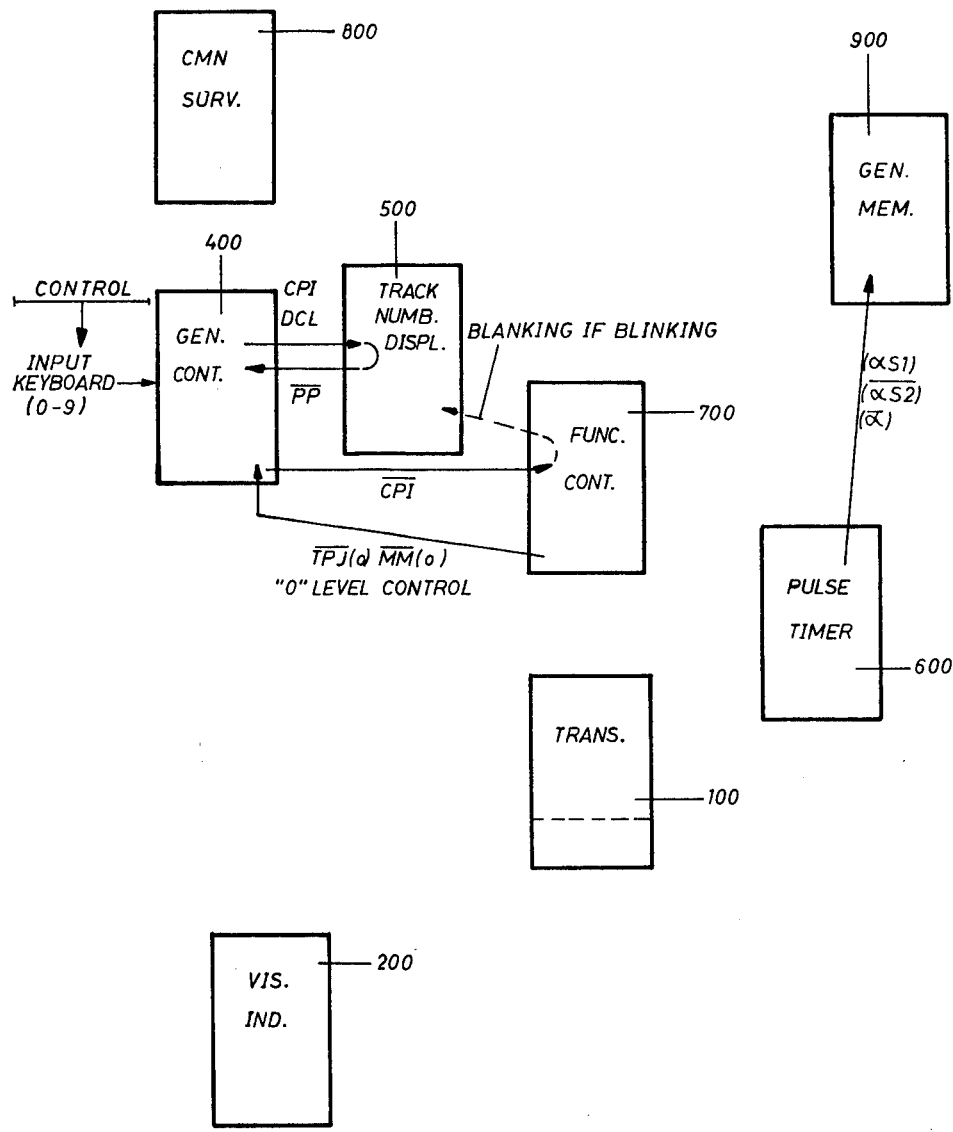
Figure 3B:
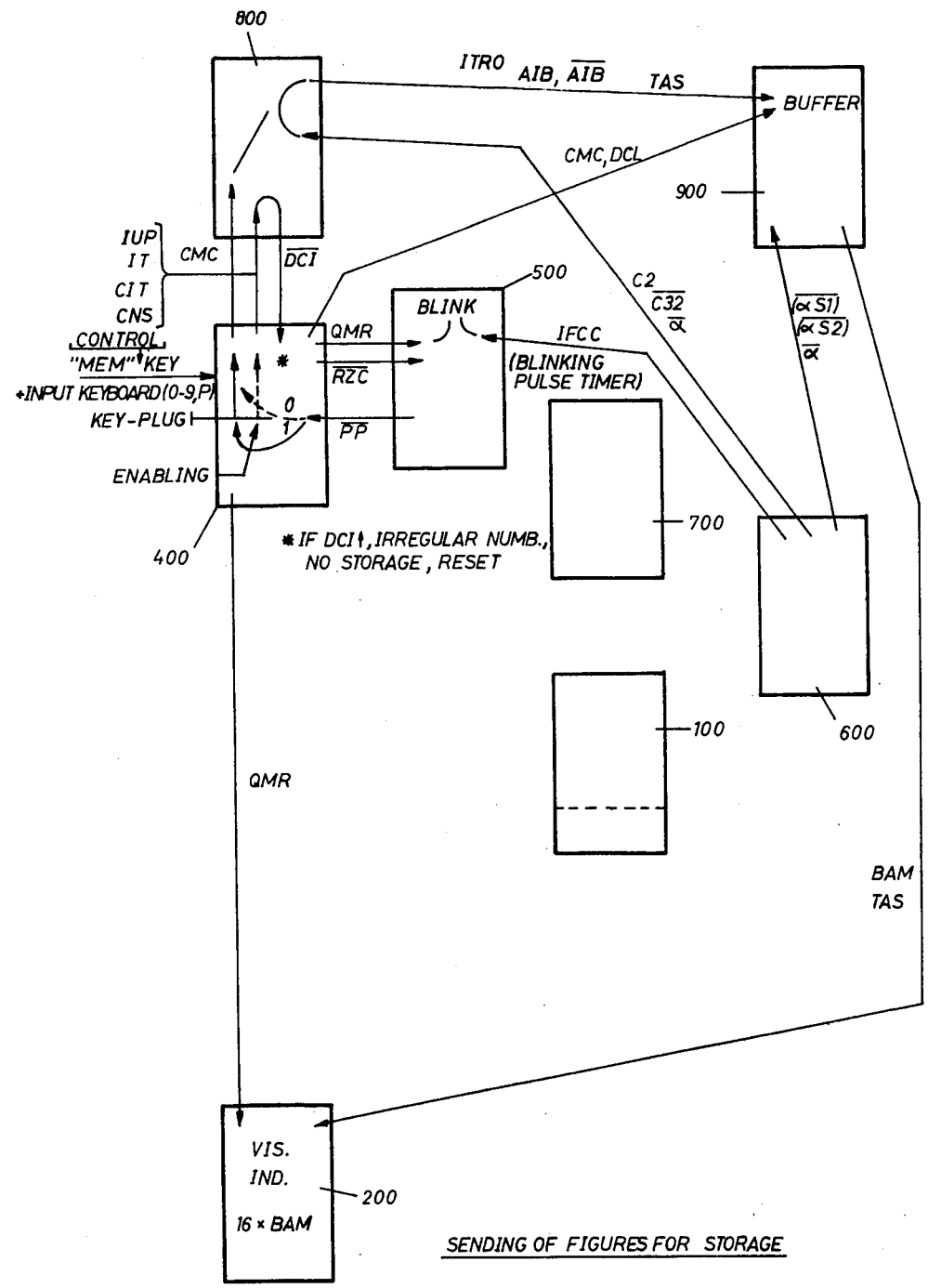
Figure 3C:
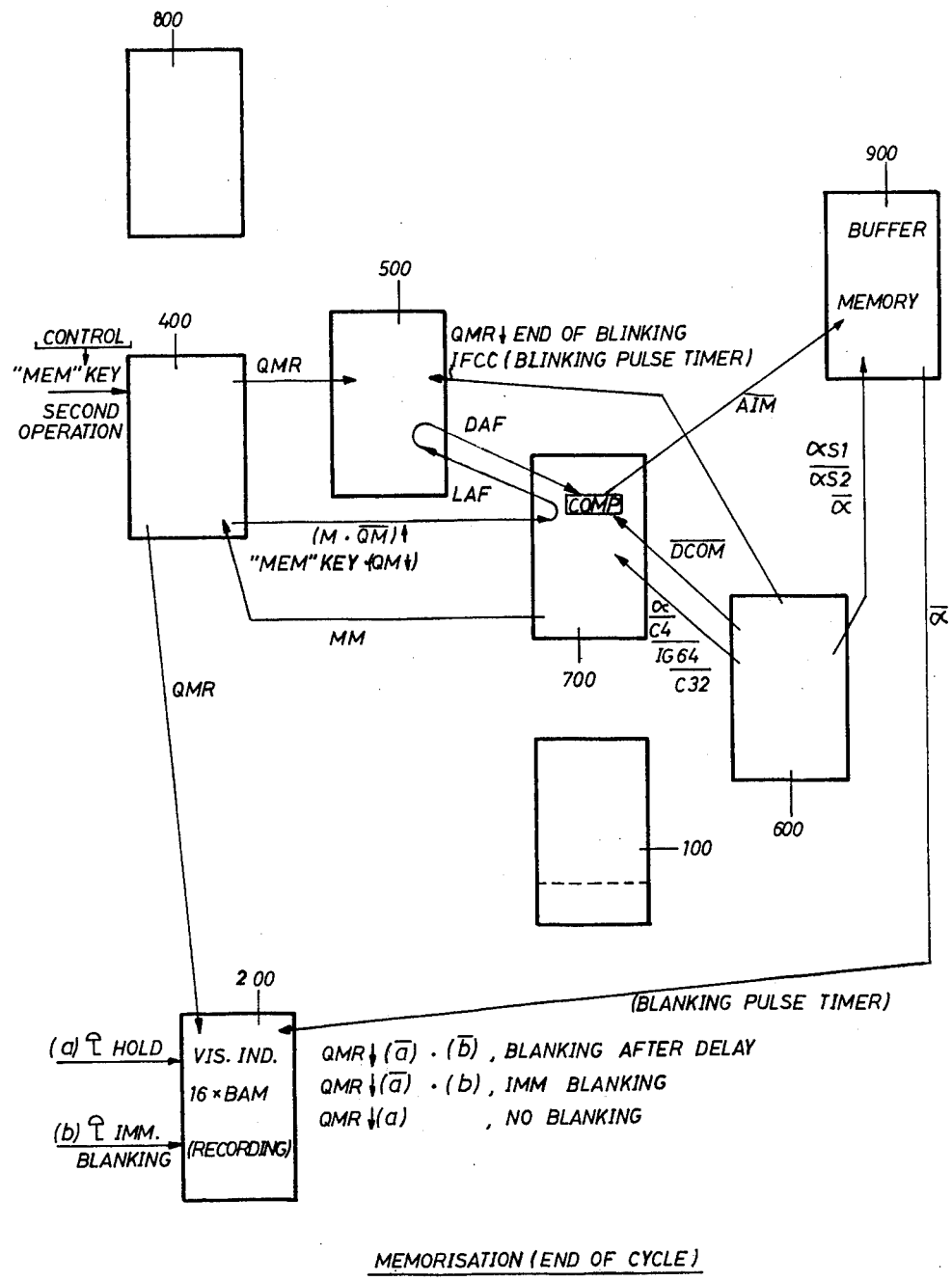
Figure 3D:
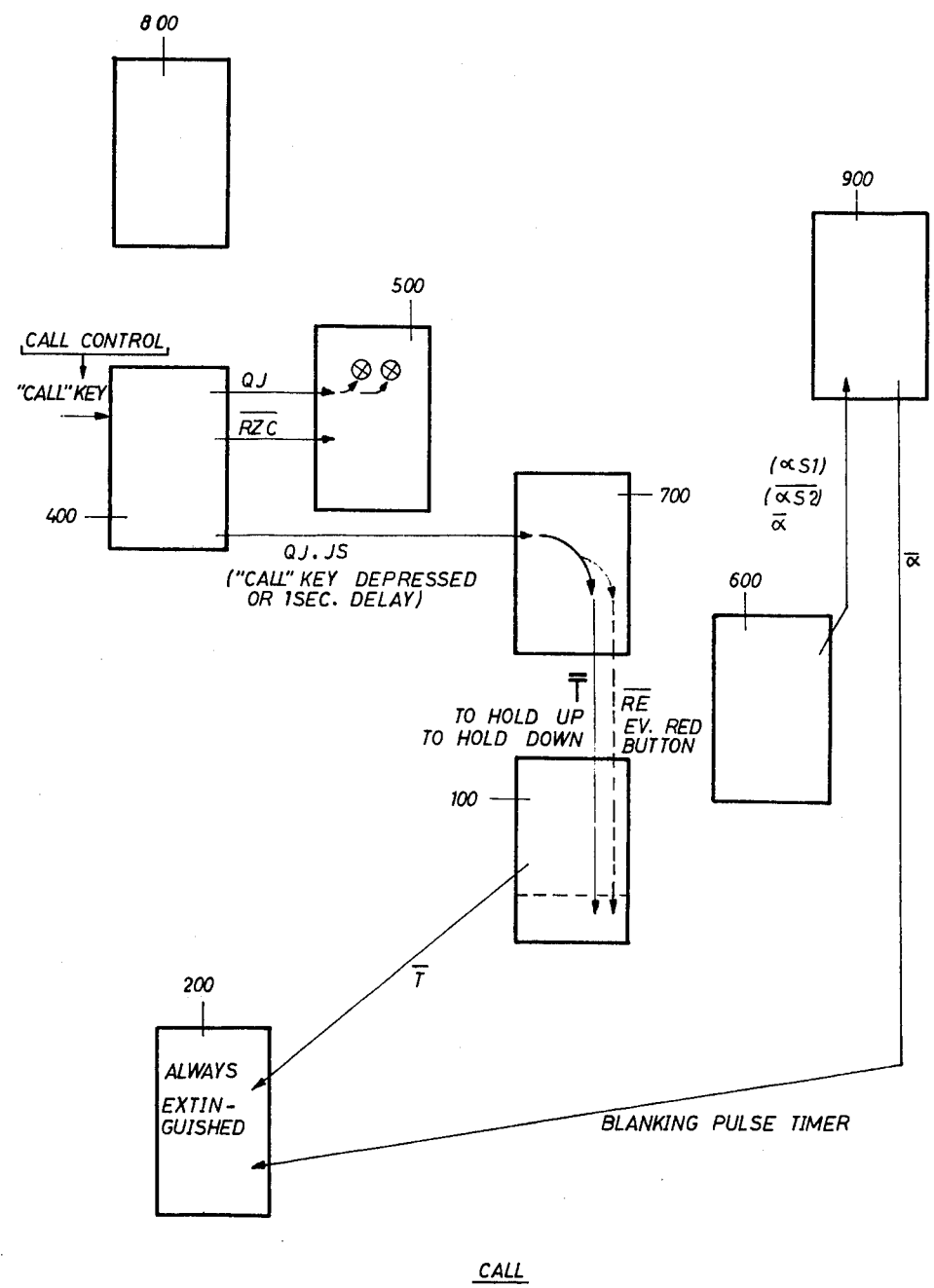
Figure 3E:
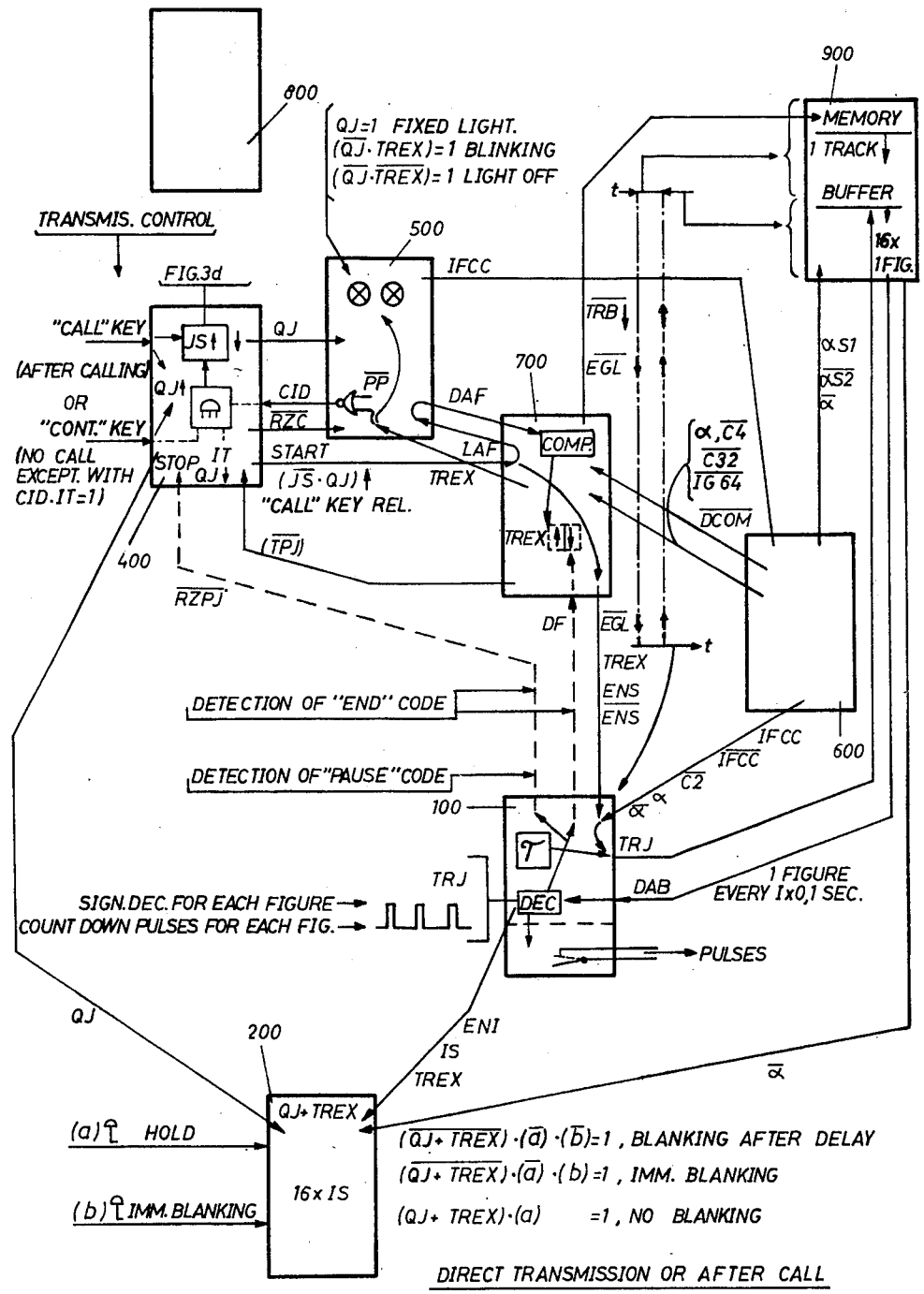
Figure 3F:
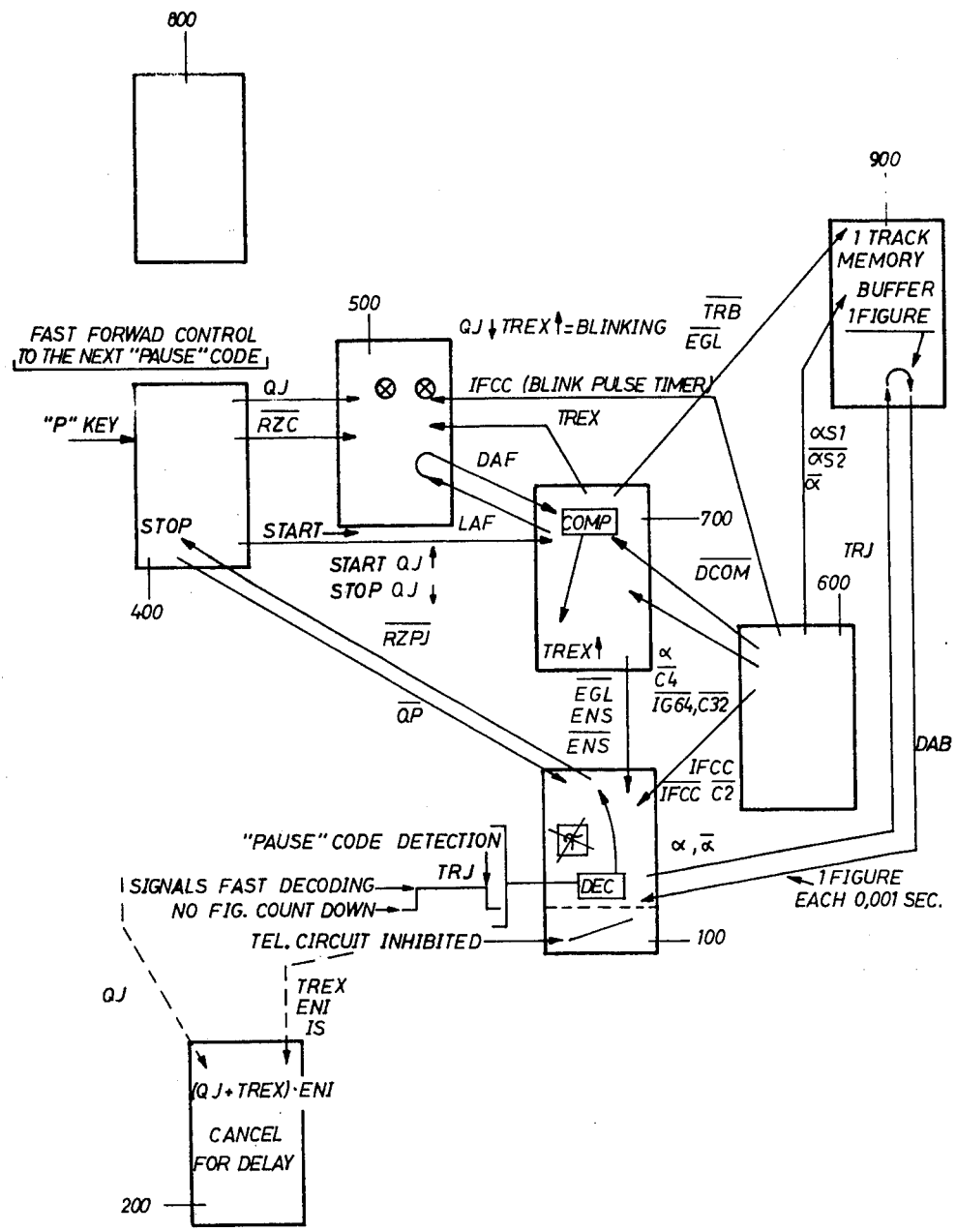
Figure 3G:
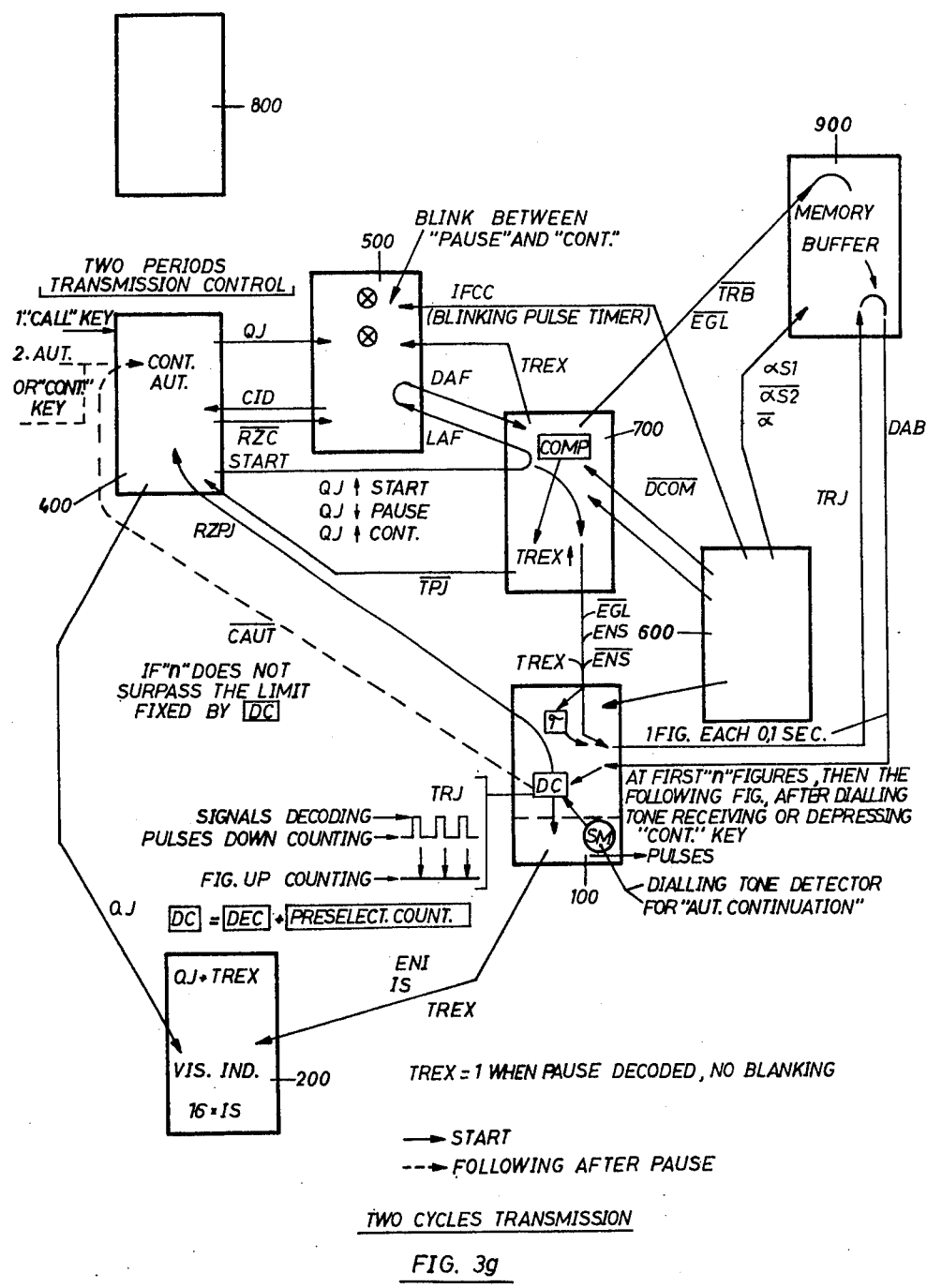
Figure 3H:
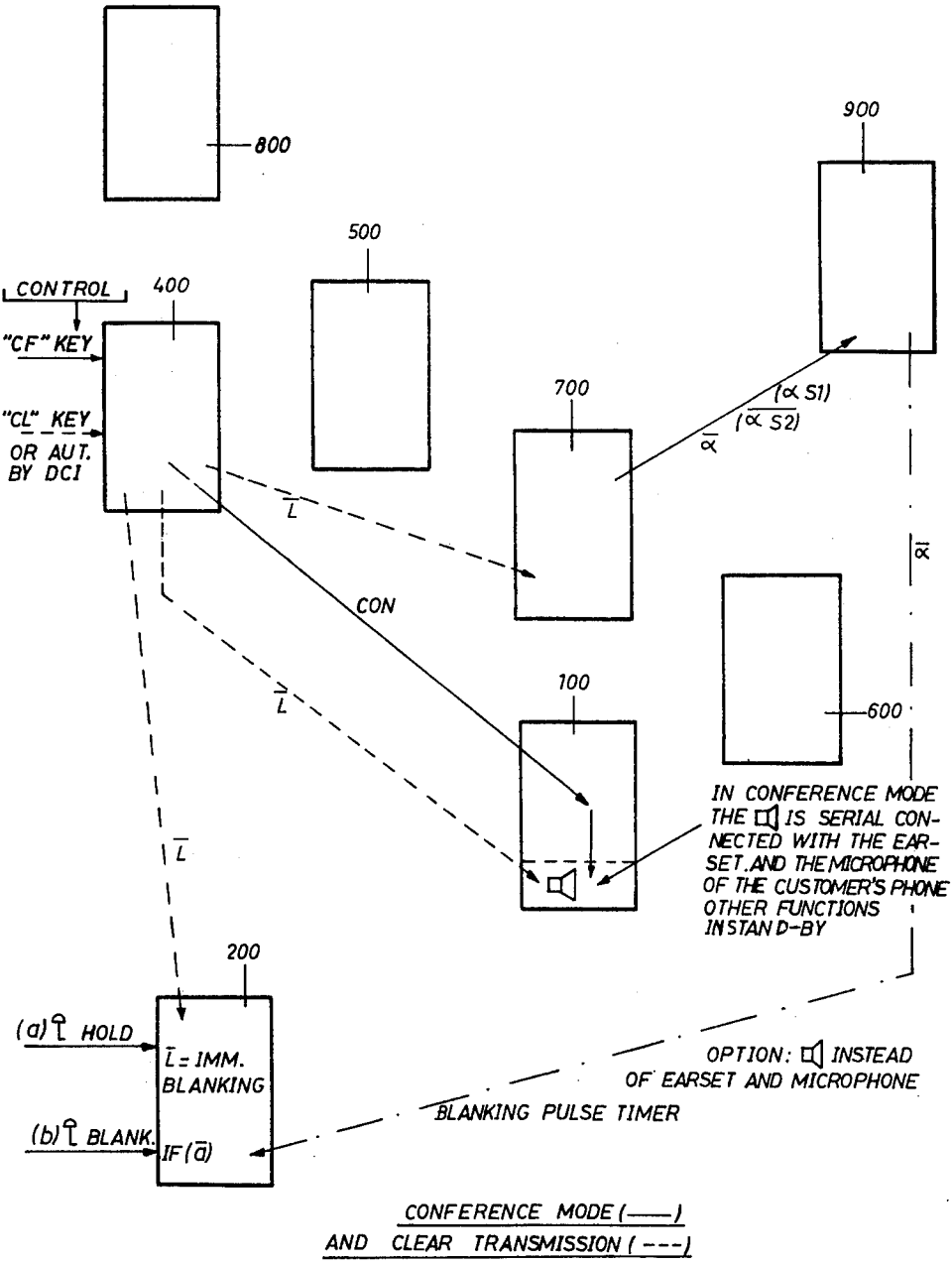

It is advisable, however, to give an explanation concerning the numeral I which is found in FIGS. 3e and 3g where it is indicated that a digit passes every $I \times 0.1$ secs. This value I is an integer and varies, for the interval between the passage of a digit and the passage of the following digit, dependent on the very value of the digit which has passed at the beginning of this interval, I being equal in fact to the digit which has just passed increased by the amount of tenths of a second which has been chosen to remain between the different pulse trains. In any case, there will always flow an integer of tenths of a second between the passage of a digit and the passage of the folllowing digit at the place indicated.

It is also advisable to give an explanation concerning the value $n$ indicated in three places in FIG. 3g. It is a question here of the amount of digits which pass either from the start of the sending of digits from the track to the first detection of a pause signal or from the last new start following a pause signal to the next pause signal. The "limit" indicated as fixed in DC consists of a determined number of digits passing one after the other, a number of digits after which the function for the automatic continuation of dialing upon receiving a pause signal is not carried out anymore. This limit may be fixed at will in the transmission unit 100, it will normally be or one or two digits if it is simply a question of obtaining a dial tone after going out onto the main system (more often with the aid of a 0), but, in certain cases, it could reach as much as three or four digits, for example, if, as is the case in Holland, the dialing of a local number following an area code can only be made upon receiving a dial tone which is supplied upon the establishment of the pass through connection onto the long-distance network designated by the area code.

We will now consider FIG. 4 which shows the detailed diagram of the general control unit 400 of the apparatus. This unit comprises first of all the device for sending digital data, that is to say, digits and, should the occasion arise, the pause order information which has been chosen as the equivalent of the number 12 (weighed in binary composition $8 + 4$). The coder 401, giving priority to the input with the lowest weight, and the various gates or inverter 405 to 409 permit the gathering of information corresponding to one of the input keys, in the binary coded digital form, at DCL, with, in addition, the information furnished by the gate 409 and which simply indicates that some input key has been pressed. This information, after passage through a delaying and forming chain 410 to 413, furnishes a delayed information CPI (change of track) which, in the display unit 500, will cause a change of condition of a register dependent on the information DCL, this assuming that one was not in the process of storage nor in the process of play, that is to say, in the process of call and of dialing.

The storage process occurs when a flip-flop 415 changes condition, whereas the play process occurs when another flip-flop 416 changes condition, the rapid advance process, similar to the play process, being determined by a change of condition affecting the flip-flop 416 and another flip-flop 417. The flip-flop 415 furnishes an output QM, and of course its complement $\overline{QM}$, and the appearance of this information conditions the storage function. This occurs in a similar way with the call and play function with the information QJ furnished by the flip-flop 416. When the latter is actuated at the same time as the flip-flop 417, the situation presents itself in an almost analogous manner, apart from the presence of an information QP coming from the flip-flop 417 and which will accelerate to a very great extent the scanning of the storage track. Looking at FIG. 4, one skilled in the art will easily understand, in what way the keys MEM, CALL, CONT and, if the case arises, P are able to actuate the flip-flop 415, 416 and 417, a series of OR-gates, of AND-gates, of inverters, of delays and of Schmitt triggers, assuring mutual interlockings and also furnishing a security relative to eventualities of rebounding of key contacts. The general control receives, from the display unit, an information $\overline{PP}$ which signals by a level 0 that the selected track is one of the special tracks where a storage is authorized. It is seen that by means of an OR-gate 440 and an NAND-gate 441, the output of which acts on the NAND-gate 426, this information $\overline{PP}$ permits the triggering of the flip-flop 41 which otherwise could not have occurred. This infers, however, that the special track accessible without code-key internal wiring has been established which assures a level 0 at the second input of the OR-gate 440, as, otherwise, even to have access to a special track, there must be at least a small code-key at one's disposal esablishing a ground at least on the first element of a code-key receiver 442. This possiblity is foreseen for the case where even the use of special tracks for limited storages, should the occasion arise, would be subject to the condition that the user disposes of at least a small code-key, which could prove useful, for example, in a large enterprise. Concerning the flip-flop 415, 416 and 417, it is advisable to note futher that these operate in an inverse manner, that is to say, that they are at rest in the 1 state and that for entering into action they change over to the 0 state.

Coming to the device 442 for inhibiting the contingencies with the aid of a code-key, it is noted that this device has three contact points in the represented embodiment. It is constituted such that a small code-key (or a simple electric code-key) grounds a first element, medium-size code-key (or electric code-key of medium complexity) grounds the first and a second element whereas a large code-key (or electric code-key of complicated shape) grounds the two first elements and a third element. A gronding of the third element blocks the gate 441 and authorizes, independently of the fact that one is on a special track or not, the triggering of the flip-flop 415, that is to say, the storage function, by furnishing the level 1 necessary for this at one of the inputs of the gate 426. In the absence of a ground on this third element, the storage is only possible if the other input of the gate 441 receives a level 0, which implies at least that one is on a special track. The application of a ground to the second element of the device 442 inhibits a forbidden information IT which is furnished to the unit 800 for the conditions for storing and monitoring to instruct it, should the case arise, to forbid the storage of numbers not answering to established restrictive criterium. This counteraction of the prohibition may also be permanently restored by a particular restriction out of service wiring. Finally, a ground on the first element of the device 442 authorizes, as has been noted, a storage on a special track, this restricted authorization could, however, as this will occur in the majority of cases, be furnished permanently by an internal bridging even if the user does not dispose of at least a small code-key for grounding the first element of the device 442. Thus, the larger the code-key (or the more complicated the form is) the larger the degree of liberty for the user is for carrying out storages. In principle, as is represented in the drawing, the large code-key, which furnishes the authorization to store on any track and thus constitutes a total storage authorization code-key, also furnishes the inhibiting of the prohibition effect also attained by a medium-size code-key for lifting the limitation or restriction on special tracks. It would be possible, however, with an electric code key in the form of a printed circuit, to have a large code-key which grounds the third element without grounding the second element, and which as a result would authorize a storage on any track without, however, lifting the restrictions which will prevent, for example, the storing of foreign telephone numbers, this for all the tracks and not just for the special tracks.

To be noted in FIG. 4 is a supplementary element, drawn in dotted line, which, if it is also grounded by means of the code-key, cuases the equivalent of a pressure on the CL (liberation) key which cancels all the procedures in progress and particularly forces the flip-flop 415 to return to resting position, thus preventing all storage. This supplementary element is foreseen, in the case of an electric code-key in the form of a printed circuit, in order to prevent fraudulence by inserting a simple piece of metal or a code-key whose whole surface is covered with a conducting layer. In this case, the tones which will come in contact with the last element will prevent all storage and only a code-key conducting at the desired locations but not conducting at other locations (where it will touch the last element) will effectively permit the suppressing of all or part of the diverse above mentioned contingencies.

The liberation [clear] function, that is to say, of cancelling all precedures in progress, does not need any particular comment, it is seen that it occurs, with the aid of the elements 443 to 446, upon actuation of the LIB key, as well as in the very beginning when the supply voltage is switched on in order to assure the resting state of the flip-flops, as also upon receiving the information $\overline{DCI}$ which the unit 800 for the conditions for storage and for monitoring supplies just when it has detected an attempt to store an unauthorized number, something which is also likened to an erroneous attempt to enter, even without restriction, a number of more than sixteen digits.

By means of a two input regenerator AND-gate 450 (Schmitt-trigger, which opens in the storage condition (whereas the similar gate 411 closes), a command information CMC for digit storage is sent to the unit 800 for the conditions for storage and monitoring and to the general memory unit 900 so that the storing of the digital information DCL from the keyboard can take place under the surveillance of the unit 800.

An information $\overline{RZC}$ is sent by a gate 455 to the display unit 500 to set the digit counter of the display back to zero again each time a storage procedure or play procedure is commanded so that the next changing of track is also registered correctly if, by chance, the selected track at the time has a single digit number (the tens field extinguished in the display window 23).

In other respects, the general control furnishes a certain amount of data to the functional control unit. By means of two gates 456 and 457, it sends an information JS which, as a rule, signals that the key CALL is pressed but which, when one is on a special track and when the restriction is in force, also signals that the key CONT is pressed. This prevents the contingencies imposed when the interdiction IT is in force from being bypassed by the dialing of a number in a combined manner with the aid of the function continuation of dialing without restoration and reclaiming of a line, a function which is commanded by the key CONT. In so far as criterion for this operation CONT = JEU is concerned, the general control receives an information CID (interdiction conditions given) from the display unit 500 which signals that one is on a special track but that one has not stopped at a pause on this track (a case in which the normal continuation function should be usable).

The unit for display and the storage of the track number 500 is relatively simple, it comprises two decoders BCD/7 segments of the classical type 501 and 502, one for the units digits of the track number and the other for the tens digit of the track number, these decoders respectively actuating two display cells which are those seen in the window 23 (FIG. 1). Two four track [sic bit] registers series/parallel 503 and 504, the first memorizing the information DCL which comes from the keyboard and the second, every second time, memorizing the output information of the first when the general control sends a change of track information CPI. A flip-flop 505, reset by the $\overline{RZC}$ information mentioned previously, triggers by means of an inverter 506 each time the change of track information CPI arrives, and, in its working state, it allows the information which was previously in the first register to pass to the second whereas in its resting state it applies a O to the second register which results in an extinction of the tens field, in a manner known for the calculator displays. If track 5 has been selected, for example, the tens field is extinguished, if afterwards a change over to track 7 is desired without having effected any operation on track 5, the display cannot to other than class the second command as a continuation of the first which would means that track 57 was desired. In these conditions, the selection of track 7 will necessitate a new pressure on the key 7 of the keyboard, signifying that one has replaced track 57 by track 7. If, on the contrary, any operation whatever (storage, play, rapid advance) has been effected on track 5, the flip-flop 505 would be reset and the further manipulation of the key 7 would be correctly interpreted as an order for selecting track 7 instead of track 5.

The two registers 503 and 504 are connected to be able to circulate their data in series, the passing of the eight tracks [sic bits] being thus sent in the form of DAF (data display) information to the functional control unit so as to allow the recognition of the selected track. This series circulation is ordered by a LAF (read display) information which the functional control sends in the form of very rapid clock pulses, so much so that the circulation of the bits of the registers 503 and 504 should never last more than one tenth of a second until the functional control unit has understood the desired track, which makes the LAF information disappear after it has, of course, furnished a number of impulses equal to an integer multiple of eight bits so that the bits are correctly in their location in the registers 503 and 504 again. The slight disturbance of the track number display which thus occurs for a maximum duration of one tenth of a second is in no way a nuisance considering its brevity.

Flip-flops, gates and inverter 510 to 515 are arranged to control the illumination, extinction or blinking of the track number display fields and the light spots (23b in FIG. 1) which they are connected to, according to what has been previously considered in connection with the functions of the apparatus seen from the outside. This logic arrangement is controlled by the information QMR which signals a storage process, the information $\overline{QJ}$ which signals a play procedure (dialing of a number), the information TREX which signals that a rest state is only temporary inasmuch as one is at a pause, and the information IFCC which comes from the pulse timer and simply furnishes the blinking pulse (an IFCC pulse every tenth of a second, blinking: lit up every two tenths of a second, extinguished every two tenths of a second, etc.).

In FIG. 5 is also seen a NOR-gate 520 which establishes the information CID previously mentioned in connection with $\overline{PP}$ and TREX data. Finally, elements (gates and inverter) 521 to 523 cooperating with the RBO output of the decoder 502, which signals the presence of an extinguished 0 in this decoder, process the $\overline{PP}$ information which signals a special track. Three different simple wirings equivalent to an internal switch allow the choice of either not having any special track, of having only the track zero as speical track or of having the tracks 0 to 9 as special tracks.

The different logic electronic circuits of FIGS. 4 to 11 are in any case in themselves clear to one skilled in the art. In order to simplify the examination of these circuits all the flip-flops were designated in the same way, that is to say, with clock inputs for positive jumps and inverted DC set and rest inputs, all the binary counters and the series/parallel shift registers were drawn with clock inputs for negative jumps and with direct (non inverted) DC set inputs, and all the other shift registers (permanent memory, buffer-memory, display registers, synchronous registers for tracks indentifying in the pulse timer unit) were drawn with clock inputs for positive jumps and a direct reset input, as far as a reset is provided.

However, all these elements are available on the market often in different designs, and in practice, it would be advantageous to choose, depending on the circumstances, for example, different flip-flops with different types of input in order to economize on inverters. In order to facilitate the study of the diagrams of the attached figures, we have, however, limited ourselves on the latter, for example, to one single and same type of flip-flop. On the other hand, in these diagrams questions of output capacity of the elements (fan out) have not been handled but it is understood that amplifiers could, if necessary, be interconnected at desired locations. On the diagrams of the attached figrues, non-inverter amplifiers were only drawn at the output of the 6,144 bit memory and for the relay control in the transmission unit.

The pulse timer unit represented in FIG. 6 only comprises elements whose functioning is permanent and does not depend on the fact that the apparatus is in the course of carrying out the one or the other operation (storage, dialing of a number, etc...). The pulse timer operates in cooperation with the 6,144 bit permanent memory which is found in the general memory unit 900; all the pulse timer elements as well as this 6,144 bit store and the elements necessary for its functioning are permanently supplied with electric power even in the case of a breakdown in the power network (a buffer-accumulator being foreseen for this purpose).

It goes without saying that all the the circuits described above are produced in integrated circuit form; in the simple prototypes, produced for testing, integrated circuits TTL were used for the units which are not necessarily permanently powered and integrated circuits C MOS, which consume less energy, were used for the units which should be constantly powered, that is to say, all the pulse timer unit (FIG. 6) and the part of the general memory unit (FIG. 9) which comprises the 6,144 bit permanent memory and its auxiliary elements. This 6,144 bit C MOS memory operates at a particularly low energy level and this is the reason why an amplifier is necessary at its output. Amplifiers are also necessary at least at certain outputs of the pulse timer, but as these outputs are for the most part connected to inverters which are in fact amplifiers, non-inverter intermediary amplifiers will not be necessary everywhere which, as previously noted, are not drawn as they do not change anything of the logic functioning of the apparatus.

The pulse timer unit 600 represented in FIG. 6 comprises an oscillator 601 which furnishes a frequency of 61,440 Hz. Based on this signal furnished by the oscillator 601 and on its complement established in an inverter 602, a pulse former 603 produced two signals $\alpha S_1$ and $\overline{aS_2}$ which serve as clock pulses for the circulation of the bits in the 6,144 bit permanent memory. The relation between the frequency of these clock pulses and the number of bits of this memory being exactly 10, one complete circulation cycle of bits in this memory lasts exactly one tenth of a second. It wil be seen further on how the data is fed into this memory and how it is read there in a non destructive manner.

In the pulse timer unit (FIG. 6), the signal $\overline{a}$ from the inverter 602 actuates a seven stage binary counter 605 which effects a division of 64 with the aid of its first six steps, the last step being only useful for supplying a reset pulse from the counter itself, a pulse which by itself is extremely short. The complement $\overline{IG\ 64}$ of this very short pulse, established by an inverter 610, is further used for certain functions in the pulse timer itself and in the functional control unit. Most of the output signals of the binary counter 605 are mainly used in the form of their complement. Inverters 606 to 609 are provided for this purpose; moreover, an inverter 611 is provided to supply the complement $a$ of the signal $\overline{a}$, a collection of the signal $a$ directly at the output of the oscillator 601 is to be avoided.

It is to be noted that the division by 64 in the binary counter 605 funishes a cycle which has exactly the same duration as the passage of a track in the 6,144 bit memory. As a matter of fact, these 6,144 bits distribute themselves in 96 tracks of 64 bits each, these 64 bits constituting four by four, in binary coded digital form, 16 digital data of the "one amongst sixteen" type. The complementary signal $\overline{C4}$ coming through an inverter from the binary counter 605 actuates two 4 bit series shift registers 614 and 615 themselves connected in series and which are looped in themselves to produce an 8 bit circulation. This circulation has again the same duration as a cycle of the binary counter 605 and as the passage of one of the 96 tracks in the 6,144 bit memory. Gates 616 to 619 are, however, interconnected to the circulation of the bits of the registers 614 and 615, in cooperation with a flip-flop 620, so that each circulation increases by 1 the value of the two digit BCD information contained in the eight elements of these registers 614 and 615. In fact, the flip-flop supplies an information which is automatically brought to 1 at the beginning of the cycle (with the aid of the pulse $\overline{IG64}$) and which is added by the adding circuit formed of the gates 616 to 619 to the information circulating which leaves the last input of the register 615 to reenter at the series input of the register 614. The clock pulse $\overline{C4}$ applied to these two registers is also applied to the clock input of the flip-flop 620, the preparation input (data input) of which receives, if need be, the carry over level of the adder. In this way, the carry overs necessary to the sum of a value 1 at each cycle are correctly effected. Gates 625 to 629, the state of which, such as it is at the third and seventh set of the circulation, is tested by a flip-flop 630, are arranged so as to set this flip-flop to the 1 state each time the double BCD information has a value 10 for the units, independent of the value of the tens, and each time that it comprises a value 9 for the tens together with a value 6 for the units. These settings of the flip-flop 630, which are brief for this flip-flop is then rapidly reset, occur, therefore, each time the BCD information of the units should be reset and each time the entire BCD information (of the tens and the units) should be reset. A signal $\overline{C32}$ coming from the counter 605 distinguishes these two cases and, by means of an NAND-gate 632 and of an inverter 633, it permits the passage of a reset pulse at the two registers 614 and 615 only when a complete reset imposes itself, that is to say, when the BCD value 96 is reached. It would be advisable to note that the partial resetting of the information takes place in the middle of the circulation cycle when the bits are shifted by four steps, which means that the resetting of the BCD information of the units takes place at the register which, at the initial (or nominal) state, contains the BCD information of the tens.

Thus, at the last output of the register 615, a BCD information files past in synchronism with the cycle of the counter 605 and with the passage of the tracks in the 6,144 bit memory, a BCD information comprising a units digit and a tens digit which is perfectly suited to designate the number of a said track which will be, for example, the next one which prepares to pass just during the next cycle of the counter 605. This information can thus be used as track identification and it is as such, after inversion in the inverter 638, sent to the functional control as $\overline{DCOM}$ (data for comparison).

Apart from the sending of various clock pulses of different rates for the functioning of all the units of the apparatus (the drawing in FIG. 6 is clear enough with regard to this), this transmitting of information $\overline{DCOM}$ constitutes one of the most important functions of the pulse timer.

It is further seen in FIG. 6 that the information C2 and its complement $\overline{C2}$ obtained by the inverter 635 are taken advantage of, that is to say, of a frequency of approximately 15,000 cycles, to supply, in the power supply section, a bias voltage generator 640 which, from the $\oplus$ voltage permanently furnished by an accumulator Acc, delivers a bias voltage intended for the 6,144 bit memory which, owing to its particular structure, permanently needs such a negative supplementary voltage. The other elements permanently supplied are simply connected between the ground and the particular positive voltage $\oplus$.

The functional control unit 700, whose drawing is shown in FIG. 7, comprises, first of all, a group of gates, differential elements, univibrators and inverters 701 to 711 which, when the "dialing of numbers" or "play" function making the information QJ appear, is ordered by the information JS (that is to say, by the key CALL or by the key CONT in the "continuation = call" conditions), firstly causes, during ½ second the transmission of an impulse $\overline{T}$, then during another ½ second the transmission of an impulse $\overline{RE}$. The pulse $\overline{T}$ supplied to the transmission unit, first of all, causes in any case the restoration of the line then its reclaiming so that eventual numbers previously dialed will not be taken into consideration. The pulse $\overline{RE}$ is intended, if the occasion arises, to simulate the manipulation of the red button which, in certain domestic exchanges, allows for the exit onto the local network. It is only at the end of this twice ½ second duration and only on the condition that the key CALL, or possibly CONT, which has set the process in motion, is then released and, that a level 1 will appear at the output of the inverter 711 to make the proper process of the dialing of the number start. In the case where the conditions for the dialing of a number would be established by the information QJ without the appearance just before of the information JS that is to say, in the case where this condition would have been ordered by the key CONT (without continuation = call), the level 1 will immediately appear at the output of the inverter 711 and there would not be any process of restoration and reclaiming of line (and, if the occasion arises, of the red button). As soon as the signal has thus appeared at the output of the inverter 711, the test procedure, that is to say, the search procedure in the memory for the selected track can begin. For this, a flip-flop 720, previously forced to remain in resting condition by its DC input becomes free to change over to its working state, the level at the output of the inverter 711 being transmitted, with double inversion, by gates 718 and 719. It should be noted that the gate 718, which receives at one input the level of the output of the inverter 711, has its other input which is already at the level 1, by means of the gate 717 which receives two levels 1, on the one hand, from a flip-flop 715 and, on the other hand, from a flip-flop 716. The flip-flop 715 has been reset to zero when the output of the inverter 711 was at the level 0; as for the flip-flop 716, it is the one of which the working condition indicates that the searched track has been found and it is thus advisable to assume that it is at rest in the process now described as if it was in its other state, there would be no need to search for the selected track as one would be in the stop condition on a pause within a track already found. When the test for searching the selected track should be made there is thus a freeing of the flip-flop 720. This latter receives at its clock input a clocked signal $\overline{C32}$ which makes a positive jump at each termination of the cycle of the counter 605 (FIG. 6), that is to say, each time there is a transfer from one track to the next in the passage of bits memorized in the 6,144 bit memory. It is therefore solely at the beginning of a track that the flip-flop 720 can now trigger. For this there should further be a level 1 at its preparation input. It is here that the data combination $\overline{DCOM}$, coming from the pulse timer 600, intervenes with the information DAF coming from the display and storage of the track number unit 500, an information which represents, in BCD, the number of the track memorized in the registers 503 and 504. The signal which leaves the gate 719, at the same time as it frees the flip-flop 720, prepares to trigger a flip-flop 721 which will trigger with the same signal $\overline{C32}$ which was just mentioned, that is to say, this flip-flop 721 will trigger at the beginning of the passage of one track or another at the output of the 6,144 bit memory. When this flip-flop 721 has triggered it transmits a level to the input of a gate 722 another input of which receives, by means of an inverter 723, the signal $\overline{C4}$ which is also that which, in the pulse timer of FIG. 6, constitutes the clock pulse for the registers 614 and 615. The output of the gate 722 will then transmit towards the display and storage of the track number unit 500, the LAF information which has already been mentioned and which will consist of pulses synchronous with those which cause the registers 614 and 615 in the pulse timer 600 to function. This LAF signal will cause, as previously mentioned in connection with FIG. 5, the circulation of bits in the two registers 503 and 504 and the information which these registers contain will pass to the output marked 1 of the register 504 to arrive, in the form of the DAF information, at a group of four gates 725 to 728 interconnected like a semi-adder (comparator), the other input of this group of gates receiving the $\overline{DCOM}$ information coming from the pulse timer. The output of this group of four gates 725 to 728 is connected to the preparation input of a flip-flop 730 the clock input of which receives the same signal $\overline{C4}$ which, inverted in the inverter 723, modulates the LAF information. Moreover, the impulse $\overline{IG64}$, which appears very briefly at the beginning of the cycle of a track, has triggered the flip-flop 730 to working position. When the positive slope (rising slope) of the signal $\overline{C4}$ occurs, the flip-flop 730 remains in the working state if the semi-adder 725, 726, 727 and 728 furnishes a level 1, that is to say, detects a difference between the signals DAF and $\overline{DCOM}$, on the other hand, this flip-flop 730 will return to the resting state if the output of this semi-adder has a level 0, that is to say, if the data DAF and $\overline{DCOM}$ are identical, as the data $\overline{DCOM}$ is the complement of the information established by the registers 614 and 615 of the pulse timer, when the information from this pulse timer is the same as that which comes from the registers 501 and 504 of the data presentation unit 500, each positive jump of the signal $\overline{C4}$ will find the two signals DAF and $\overline{DCOM}$ different, that is to say, it will find a level 1 each time at the preparation input of the flip-flop 730. The signal $\overline{C32}$, applied to the clock input of the flip-flop 720, will therefore, occur one time or another when the flip-flop 730 is still in its working state, all the test moments since the last pulse $\overline{IG64}$ having found a level 1 at the data input of this flip-flop 730. At this moment, the flip-flop 720 will change over and this will signify that there has just been a coincidence repeated eight times in succession (hence at one cycle of a track) between DAF information of the selected track and the $\overline{DCOM}$ information of the passage of the track number. It is to be noted that the flip-flop 730 can only change over to the working state by a pulse at its DC set input, as its direct output is connected to its reset input and, once reset, it cannot be further actuated by pulses applied to its clock input. When the pulse $\overline{IG64}$ arrives at the other input, it begins by splitting the flip-flop in two, the direct output following the setting order whereas the inverse output would continue to follow the order to maintain the resting state given by the direct reset input, But this resetting order ceases as soon as the direct output passes to the state 1, such that the triggering can take place upon command, and only upon command, from the DC input for the passage to the working state (set). Similar considerations would be applicable to the flip-flop 715 for its reset to zero by the signal coming out of the inverter 711 when the circuit is not in the play state.

When the flip-flop 720 has changed over, it sends an information $\overline{EGL}$, in the form of a level 0, to the general memory, and, together with the information $\overline{TRB}$ sent by the output of the gate 718, this information $\overline{EGL}$ will connect a 64 bit buffer-memory to the output of the 6,144 bit permanent memory. The next time the signal $\overline{C32}$ makes a positive jump, the flip-flop 730 cannot be in its working state anymore (it stays there during the course of a cycle only once every 96 times) and the flip-flop 720 will return to the resting state removing the level 0 which constituted the information $\overline{EGL}$. The transfer between the 6,144 bit memory and the buffer-memory will be achieved, the buffer-memory then containing the selected track information. Returning to the resting state, the flip-flop 720 will trigger the flip-flop 716 whose working state will send the information TREX (transfer executed) to the different units of the apparatus, the triggering of this flip-flop 716 having also the effect, by means of the gate 717, of interrupting the passage through the gate 718 so that the flip-flop 720 is obligingly maintained anew in the resting state. Moreover, the return to the resting state of the flip-flop 720 will trigger another flip-flop 735, rapidly recalled, by the way, to the rest state by the signal α. The brief impulse at the inverse output of this flip-flop 735 will reset the flip-flop 721 to the rest state such that the circulation of the information in the registers 503 and 504 will also stop at the instant the flip-flop 720 returns to the rest state.

After having seen the way in which the non destructive reading of the information on the selected track of the 6,144 bit memory is operated, it is a matter now of seeing how the functional control 700 handles the inverse transfer assuming that the buffer-memory now contains a new number to be memorized in the selected track, the condition means for the storage and monitoring being assumed as authorizing this transfer. It is thus advisable to assume that the flip-flop 415 (memorizing) was in the working state within the general control unit 400 and that the information $\overline{QM}$ arriving at the functional control has the level 0. An actuation of the key MEM resets the flip-flop 415 to the rest state and the information (or the signal) $\overline{QM}$ makes a jump from the level 0 to the level 1. If this jump is due to a manipulation of the key MEM, an information M coming from this key will also be available in the functional control 700. A flip-flop 750 will trigger, when the previously indicated conditions are realized, at the moment of the positive jump of the information $\overline{QM}$. The output of this flip-flop 750 will act on the gate 719 and will cause the search of a track exactly as has been previously explained within the framework of a process for the dialing of a number. When the information $\overline{EGL}$ occurs, it will not this time be together with the information $\overline{TRB}$ but together with the information $\overline{AIM}$ processed in a gate 751. This would have as effect, in the general memory, the causing of the transfer of the information present in the buffer-memory to the track which will be presented from the 6,144 bit memory. Moreover, the flip-flop 735, at the time of its brief impulse at the end of the duration of a track, resets the flip-flop 750 to the rest state, this therefore results in the suppression of the levels 0 constituting the information $\overline{EGL}$ and $\overline{AIM}$.

It is pointed out that the clear (CL) function also causes a brief triggering of the flip-flop 735 and thus, if need be, the resetting to the rest state of the flip-flops 721 and 750.

It is pointed out that once the flip-flop 716 has triggered, the flip-flop 715 also triggers the next time a pulse of the $\overline{IFCC}$ information intervenes, a pulse which occurs every tenths of a second, when the circulation of the 6,144 bit memoby has ended a complete cycle. The positive jump of the $\overline{IFCC}$ information which triggers the flip-flop 715 occurs, as can be seen on the pulse timer diagram, after an interval equal to two periods of the α information counted from the triggering from $\overline{C32}$. Once the flip-flop 715 has changed over, it remains in the working state as long as the play conditions exist, that is to say, as long as a level 1 is at the output of the inverter 711. The flip-flop 716 (TREX) may, in certain cases, return to the rest state quicker than the flip-flop 715 and, in certain other cases, remain in the working state when the latter returns to the rest state. The return of the flip-flop 716 to the rest state is controlled by means of an inverter 760 and a gate 761 by any of the following phenomena: passage of $\overline{QM}$ to the O state (storage condition), passage of $\overline{L}$ to the O state (clear), passage to O state of the information $\overline{CPI}$ (change of track) and passage to 0 level of the information $\overline{DF}$ (detection of the fact that all the significant data memorized on the track in the course of play have been "played").

Normally the storage process with the aid of the flip-flop 750 lasts merely a tenth of a second. If, however, a non-existent track were selected, for example 97, this process would not stop until the key CL is pressed. Up to that point the general control should verify the presence of the storage condition and it is for this reason that an output of the flip-flop 750 sends the information $\overline{MM}$ which particularly has a function the maintaining of the blinking of the track display field as long as the effective storing is not finished.

The fact that the flip-flop 715 can partially resume, by means of the gate 717, the functions of the flip-flop 716 can allow a changing of track already in the course of dialing a number, as long as the flip-flop 716 has already triggered and has made the flip-flop 715 trigger. This possibility could, however, introduce a certain confusion for the user and there is the possibility (see FIG. 4) of causing or excluding a changing of the track during transmission, this with the aid of a simple change of wiring. However, this change can take place at the earliest when the flip-flop 715 has triggered and that is why there is a gate 770 which combines the information QJ and the information $\overline{ENS}$ which is at 0 level when the flip-flop 715 is at the working state. The information furnished by this gate 770 is at level 1 either when QJ is at level 0 (play function not in service) or when $\overline{ENS}$ is at level 0 (play function in service, but flip-flop 715 already in working state). The changing of the track possible in transmission is thus prevented by the information $\overline{TPJ}$ from the gate 770 only during the short interval of time between the beginning of the call function and the triggering of the flip-flop 715.

The conditions for storage and surveillance unit 800 (FIG. 8) controls the entry of the DCL information of the digits of the keyboard into the buffer-memory comprised in the general memory unit. For this, the information CMC (storage control of digit) is supplied, by an inverter 803, to the clock input of a flip-flop 801 which changes to the working state at the end of the impulse of the CMC information. A flip-flop 802 triggers then when the next "end of track" occurs, by the effect of the information $\overline{C32}$. As soon as the flip-flop 802 has triggered, the next passage of the basic frequency signal $\overline{a}$ to to the 1 state resets the flip-flop 801, by way of a gate 804, so that the next position jump of the information $\overline{C32}$, at the next end of track, also resets the flip-flop 802. The latter is therefore in its working state during exactly one cycle of a (any) track. During the period it is in the working state, the flip-flop 802 opens a gate 805 which passes the clock signal C2 to a counting by 17's arrangement comprising a gate 809, a 4 stage binary counter 810, an inverter 811 and two flip-flops 812 and 813. The latter has been set when the apparatus was not yet in memorizing operation, that is to say, the information $\overline{QM}$ was at the 1 state and its complement established by an inverter 808 was at the 0 state. The clock pulses of the C2 signal supplied to the counting by 17's arrangement correspond to the rhythm that the quartetts of bits forming a digital information pass to the output of the 6,144 bit memory. A setting of the flip-flop 802 thus advances the 17 binary counter arrangement sixteen steps. This arrangement operates as follows: The first sixteen steps actuate the binary counter 810, the sixteenth step resetting it and actuating the flip-flop 812. The latter blocks the input of the counter 810 but causes, on the other hand, the flip-flop 813 to react on the seventeenth impulse since it applies a level 1 to its data input. When the flip-flop 813 has triggered, it resets the flip-flop 812 and the cycle begins again. On the other hand, a flip-flop 820 is set at the same time as the flip-flop 812 resets when the flip-flop 813, at the seventeenth impulse coming from the 17 cycle counter arrangement, changes over to its working state. At the time of the first triggering of the flip-flop 802, the flip-flop 820 cannot trigger as the flip-flop 813 is already in its working state. This flip-flop 820 furnishes two complementary data AIB and $\overline{AIB}$ to the general memory unit which alters the connection of the buffer-memory in the general memory unit. When the flip-flop 820 is in the rest state, the information AIB is at the 0 level and the input of the buffer-memory is connected so as to receive, by four bit series, the keyboard information DCL by intermediary of a series/parallel 4 bit register. The latter is arranged for furnishing only 1 levels after having sequentially furnished the four bits which have been supplied it in parallel. On the other hand, the flip-flop 802, when it is in its working state, supplies an information $\overline{ITRO}$ which allows the clock pulse $\overline{a}$ to effect the transfer between the said four bits register and the buffer-memory in the general memory unit. Thus, the first actuation of the flip-flop 802 passes the first digital information formed at the keyboard into the buffer-memory, this information reaching the bottom of the buffer-memory, all the other positions of which then receive a level 1. When a second digit is keyed in at the keyboard, the flip-flop 802 operates anew during the duration of a track, but this time the flip-flop 820 has been able to trigger at the moment the information CMC arrives, this flip-flop 820 falling back again after one step of the 17 counter arrangement, in a way that the data AIB and $\overline{AIB}$ have their levels inverted during the first of the sixteen steps permitted by the flip-flop 802 then regain their state corresponding to the rest state of the flip-flop 820 for the last fifteen steps. This changing of data AIB subjects the buffer-memory to be looped to itself instead of having its input open to receive the keyboard information by means of the series/-parallel four bit register. During the time the pulses AIB and $\overline{AIB}$ have their levels inverted, the impulses α are not applied to this four bit register in the general memory. Thus, the procedure controlled by the flip-flop 802 comprises, first of all, the transfer to the buffer-memory input of the four bit information which was at the bottom of it, then, the AIB and $\overline{AIB}$ data having returned to their non-inverted state, the transfer as a second digit of the digital information previously stored in the four bit register conforming to the keyboard manipulation. At the time of the third digit, the seventeen step counter is two steps behind this time so that the flip-flop 820 will remain in the working state during the two first steps, which will place the two informations first at the input of the buffer-memory which were at the bottom of it, then, following these two information, as third information, the one which comes from the four bit register. This procedure continues until the sixteenth digit and a system of these sixteen digits is thus obtained in the buffer-memory, if sixteen digits were really sent, such that the first is at the bottom of the buffer-memory and the others following it, the sixteenth, if one exists, is close to the input of the buffer-memory. The 17 counter arrangement would have effected in fact only fifteen cycles, if a seventeenth digit were entered it would have made sixteen cycles and would be in the initial position again. After only fifteen cycles, say the sending of sixteen digits, it is not in the same position but in the position corresponding to its second step, that is to say, that from which sixteen steps must be made to return to the initial state. This possibility permits distinguishing whether on occasion the entry of one digit too many has been attempted, as, in such a case, this initial position would be regained after the actuation of the flip-flop 802, whereas during the 16 digits this initial position is regained before or during the operation of the flip-flop 802. If, on the other hand, the buffer-memory has been filled with an admissible number of digits, the feed operation into the permanent memory previously studied may take place and the 16 digits pass into the selected track of the permanent memory. If the second manipulation of the key MEM is effected after having only entered less than sixteen digits into the buffer-memory, the last missing digits will be replaced in the track by a digital information of weight 15 which, at the time of transmission, causes the appearance of the signal $\overline{DF}$ which resets the flip-flop 716 in the functional control (FIG. 7) and the flip-flop 416 in the general control unit (FIG. 4) to the rest position, putting an end to the transmission operation. It is therefore altogether possible also to memorize less than sixteen digits.

When the flip-flop 802 returns to its rest state, the level of its inverse output is transmitted, through an arrangement for the delay of the transmission of the level 1 made up of two gates 825 and 826 which use for this the information $\overline{a}$, to the clock input of a flip-flop 827, reset before the storage process begins, and that this voltage jump at its clock input will trigger to the working state if a level 1 is at its preparation input just at the instant of this jump. It is in this manner that the monitorings relative to the forbidden digits or to a great number of digits are effected when the information IT (interdicted) is established by the general control. An attempt to enter a seventeenth digit is also likened to the entry of a digit in excess, irrespective of the presence or the absence of the forbidden information IT. For that reason, it is seen that the inverse output of the flip-flop 813 is connected to one of the inputs of a NAND-gate 830, the output of which is connected to the preparation input of the flip-flop 827. When, just after the actuation of the flip-flop 802, the flip-flop 813 is at the working state, this signifies that a seventeenth digit was received and, by the gate 830, this state causes the appearance of a level 1 at the preparation input of the flip-flop 827. The latter therefore triggers and sends an information $\overline{DCI}$ which causes a process of clearing similar to that which results from a pressure on the key CL. This clearing then immediately resets the flip-flop 827 to the rest state, but the latter has had the time to trigger the flip-flop 801 and to thus start a new operation of the flip-flop 802 which will lead to a sweeping of the buffer-memory which will solely take level 1 (information 15) since no information will be present in the four bit register connected to the input of the buffer-memory.

When there is a limitation of the number of digits, the process is the same and it is then essential to thus empty the buffer-memory so that a further double manipulation of the key MEM, without intermediate manipulation of a digit key, cannot cause, in spite of everything, the storage of this number containing one digit too many.

For these limitations of the number of digits, the unit 800 comprises a gate 831 whose output is connected to another input of the gate 830 and which causes the functioning of the flip-flop 827 when all its three inputs receive a level 1. The information of interdiction IT is brought to one of the latter such that when this is inhibited no actuation of the flip-flop 827 can take place as a result of an excess of digits. Another of these three inputs is connected to the inverse output of the flip-flop 812 in a way as to prevent a single digit from already being considered as being too many. Finally, at the third of these inputs, there can be optionally connected, by an internal wiring installation, either a level 0 (ground) a situation in which there would never be such limitations, or the output of a NOR-gate 832 to the three inputs from which various wirings may be installed according to the number of digits which should not be exceeded in the case of interdiction. These three inputs are connected to the different outputs X Y Z W of the counter 810, or further (indication N) to the ground, conforming to the table shown at the top of FIG. 8. When the three inputs of the gate 832 are all at the level 0 after the operation of the flip-flop 802, a situation which occurs after a more or less large number of digits, according to the way in which the said connections are made, the third input of the gate 831 would have a level 1 and the flip-flop 827 will react as previously indicated concerning the seventeenth digit. The table in question does not comprise combination for a sixteen digit limitation, inasmuch as this would be tantamount to an absence of limitation being obtainable by the wiring installation between the gates 831 and 832.

There remains to mention the way in which the forbidden digits are monitored. For this FIG. 4 must be referred to again where there is at the top left hand side, firstly three collecting lines furnishing a multiple information $\overline{CNS}$ and then four other collecting lines furnishing a multiple information $\overline{CIT}$. The four latter concern forbidden digits such as first digit, second digit, third digit and such as fourth digit, respectively. The three collecting lines furnishing the information $\overline{CNS}$ (surveillance) respectively concern the first, the second and the third digits of a number not as an interdiction but as an information specifying whether there is or is not reason to pursue the monitoring of the forbidden digits (CIT). It is seen that each of these seven collecting lines can be connected by means of diodes to the different digit inputs just as to the input P for the storage of a pause (below the gate 403). Each of these different lines which are fed into the unit for the conditions for storage and monitoring 800, FIG. 8, bears a level 0 when one of the entry keys is pressed to the contact of which it is connected by a diode. It is seen in FIG. 8 that a resistor-capacitor group is connected to each of these seven lines in order to maintain them, if need be, at the level 0 slightly longer than the corresponding key is pressed in order to compensate the transfer times through the various elements to the conductor bearing the information CMC. Each of these lines arrive, first of all, at one of the gates 841 to 844 for the lines supplying the forbidden digits information $\overline{CIT}$, and at one of the gates 851 to 853 for the lines supplying the surveillance information $\overline{CNS}$. The other inputs of these different OR gates are connected to different locations of the 17 cycle counter arrangement or to gate 861 and 862 controlled by the latter so as to introduce a level 0 at the beginning of the first digit, only at the beginning of the second digit, only at the beginning of the third digit and only at the beginning of the fourth digit, respectively. In order to achieve this, the gate 862 is connected to the four outputs of the counter 810 and the gate 861 is connected to the three last outputs of this counter and to an inverter 860 connected to the first output of this counter.

When a digit, which is forbidden or subject to monitoring if it appears, for example, as second digit, effectively appears under these conditions, one gate, 845 if it is a question of a forbidden digit or 855 if it a question of a digit necessitating the maintenance of the monitoring, furnishes a level 1 at its output, whereas if this situation does not arise it furnishes a level 0. The flip-flop 856, of which the state 1 signifies that the monitoring should take place, has been set at the working state prior to the commencing of the storage function. Each time the information CMC, inverted by the inverter 803, effects a positive jump, that is to say, each time a digit is parallel fed into the four bit counter of the general memory unit 900, the flip-flop 856 remains in the working state if the digit fed in is such that the monitoring should be maintained, whereas it resets if the digit fed in is not one of those which necessitates the maintenance of the monitoring. Once reset, the flip-flop 856 cannot trigger anymore by pulse command, only the DC command, when the apparatus is not in memorizing operation anymore, being able to trigger it anew, this similarly to what was shown concerning the flip-flop 730 in the functional control 700.

When the gate 845 changes to or is at the 1 state at the instant of said inverted jump of the information CMC, as long as the flip-flop 856 has remained at least until then in the working state and as long also as the information IT signals that the interdiction is in force, the flip-flop 850, which was set before the beginning of the memorizing function, will trigger in its rest state, due to the fact that a level 0 is applied at its data input by the gates 846 and 848. The direct output of this flip-flop 850 is connected to the third input of the gate 830 and, if this flip-flop 850 has reset, the flip-flop 827 will be actuated at the moment when the flip-flop 802 resets, and there would be a clearing impulse similar to that which was previously mentioned.

It is further possible, in order to prevent a surveillance from being by passed by the entry of a pause subsequent to the digits monitored and from which any number could be memorized, to prevent the storage of a pause, as long as the interdiction is in force, once the surveillance has ceased, that is to say, the flip-flop 856 has triggered in its rest state. For this, the inverse output of this flip-flop is applied to a gate 847, another input of which receives the interdiction signal IT and the third input of which receives an information IUP which comes from the NOR output of the coder 401 of the general control and which has a level 1 when a pause information is fed into the number which is to be memorized. Besides, as it is visible at the top of FIG. 4, one can wire to the connection bearing the information IUP either a level 0 (ground) which renders possible an ulterior pause or the said NOR output of the coder 401, which will render all ulterior pause storage impossible, as an attempt to store an ulterior pause will cause the resetting of the flip-flop 850 to the rest state, this will therefore result in the functioning of the flip-flop 827 and the clearing, that is to say, the annulation of all the prepared storage process.

The general memory unit 900, the drawing of which is shown in FIG. 9, has already been partially described in connection with FIGS. 6, 7 and 8. There can further be mentioned that the 6,144 bits memory 901 is made up of six integrated cicuits of the CMOS type of 1,024 bits each and that the input branching of the memory unit made up of three gates 902 to 904 and of the inverter 905 which enables, by the information $\overline{AIM}$, to connect the input of the memory 901 to the output of the buffer-memory 910, is arranged so that, in the case where the voltage supply would be lacking at the functional control unit and where a high impedance level 0 would appear at the connection carrying the information $\overline{\text{AIM}}$, a subsidiary connection to the ⊕ would, nevertheless, ensure all the regular circulation in closed loop of the 6,144 bits contained in the memory unit. Moreover, it is shown that for the transmission from 6,144 bit memory 901 to the buffer-memory 910, the output of the intermediate amplifier 907 may be directly connected to an input lead of the integrated circuit forming the buffer-memory 910, this memory being provided with an internal input branch connection controlled at an input where the information $\overline{\text{TRB}}$ previously considered in connection with the functional control is applied. The connection of the other input of the buffer-memory (the other input which is in operation when $\overline{\text{TRB}}$ is not at level 0), either at the output of the buffer-memory 910 itself or at the four bit register 920, as a function of the AIB and $\overline{\text{AIB}}$ data, is effected with the aid of three gates 911 to 913. The clock impulse for the buffer-memory 910 consists of the inverted signal $\overline{a}$, the transmission or non transmission of which is controlled with the aid of two gates 914 and 915, according to the different functions, by the information $\overline{\text{ITRO}}$ from the unit 800 for the memorizing preparation, by the information EGL, from the functional control unit 700 for the transmission from the memory 901 or to the memory 901, and by an information $\overline{\text{TRJ}}$ for the transmission of digits or digital data one by one into the transmission unit. When the gate 912 is open in order to connect the input of the buffer-memory 910 to the output marked 1 of the four bit register to enter into the buffer-memory, a gate 916, which follows an inverter 917, leads the clock impulse which is applied to the input of the buffer-memory also to the clock input for the series shift clock input of the four bit register 920. Moreover, the paralleled entry of the information DCL from the keyboard under the control of the information CMC, takes place in a manner identical to that which was shown in connection with FIG. 5 for the feed in of the information DCL under the control of the information CPI at the time of a changing of track.

It is further shown in FIG. 9 that the output information of the four bit register 920 is sent to the unit constituting the display for the visual indication of the storage operations. An information TAS, formed in the conditions for the storage and monitoring unit 800, is sent at the same time, this information consisting of an impulse which passes to the level 1 when the information CMC has already entered the keyboard information into the register 920 and which resets before this information has begun to leave this register 920. In addition, the basic frequency information $\overline{a}$ is also transmitted to the visual indication unit from the general memory, which is useful to the visual indication unit for erasing registers in order to switch off the visual indications.

The part of the apparatus which constitutes the transmission unit 100 mainly comprises, in addition to the part for sending impulses, which is galvanically separated from the rest of the apparatus by the presence of relays, a decounter register arrangement comprising a four bit register series/parallel 101, an electronic branch 102, a NAND gate 103, an electronic branch 104, flip-flops 105, 106 and 107 and an inverter 109. The register 101 picks up, via the inverter 109, clock impulses for a series shift, these occur at the rate of a train of four brief and uninterrupted inpulses which recurs every tenth of a second in the dialing of numbers operation. When this register 101 has stored, either by its parallel inputs or by its series input, a binary information having a certain value, the said four impulses train causes every tenth of a second a rapid circulation of the four bits, a value 1 being subtracted each time from the binary combination value of this information so that after a number of tenths of seconds equal to the digit initially stored, the contents of the register becomes equal to zero, this is sequentially tested by the flip-flops 106 and 107, similar to what has been shown concerning the flip-flops 730 and 720 of the functional control 700 but with inverse levels.

In order to cause a decrease of the stored value by 1 at each circulation, that is to say, in order to cause a decrementation, the elements 103 to 105 are arranged in a way analogous to the elements 616 to 620 of the pulse timer 600 with this difference that the carry conditions are those of subtraction and not of addition (a synchronous incrementer changes into a synchronous decrementer if inverter means are branched to its input and to its output).

The transmission unit receives from the functional control 700 complementary data ENS and $\overline{\text{ENS}}$ (synchronous transmission) which tells if it is necessary or not to cause a transmission. When the flip-flop 107 has detected a 0 state in the register 101 it sets, then, a little less than a tenth of a second later, it picks up a signal $\overline{\text{IFCC}}$ from the pulse timer, in synchronism with the end of a circulation in the 6,144 bit memory, which resets it. This function of the flip-flop 107 causes, by means of a gate 108 at the conducting state, the entry into the register 101, by the parallel inputs of the latter, of an information the value of which is 9 (8 + 1) if the transmission unit receives an information $\overline{\text{ENS}}$ of level 1 and is either 3, 5 or 7, dependent on a wiring connection shown in FIG. 10 below the register 101, when it is the information ENS which exhibits the level 1 (the information $\overline{\text{ENS}}$ having then a level 0). According to the circumstances, it will therefore flow 0.09 seconds, or 0.07 seconds or 0.05 seconds, or 0.03 seconds until the flip-flop 107 sets anew. It is seen that the flip-flop 107 controls the clock input of a flip-flop which constitutes in fact the first step, separated, of the four step counter 110. However, as long as the flip-flop 715 in the functional control has not set, the information $\overline{\text{ENS}}$ is at the level 1 and maintains all the steps of the counter 110, including the first flip-flop, at the rest state. Nothing will happen as long as the information ENS has not changed state. If the track search test has taken place, the flip-flop 107 is brought into its working state by the information EGL which, as has been mentioned, occurs during the duration of a track (approximately 1/1000th of a second) shortly before the flip-flop 715 triggers, at the end of a complete circulation, this triggering changing the states of the data ENS and $\overline{\text{ENS}}$. However, the flip-flop 107 resets just before the change of the information ENS so that when this change takes place, the register 101 first of all lets 9/10th of a second pass before the flip-flop 107 is at the working state at the same time as the information $\overline{\text{ENS}}$ is at the 0 state. When, after this condition has taken place, the flip-flop 107 resets, the flip-flop making the first step of the counter 110 changes over and in turn triggers a flip-flop 115 which transmits the information $\overline{\text{TRJ}}$ in the direction of the general memory. At the same time, this flip-flop 115 maintains the gate 108 in the non conducting state and it actuates further the branching 102 which controls the input of the register 101. In addition, this information $\overline{TRJ}$ causes the transmission of the four bits which are farthest at the bottom of the buffer-memory 910 and which represent the first digit of the number to be dialed. These four bits sequentially enter, in the form of the information DAB, into the register 101 not without already losing one unit of value which corresponds to the decrement for the period of 0.1 seconds in actual course. The flip-flop 115 returns, however, rapidly to the rest state at the time of the triggering of a flip-flop 116 which takes place at the moment of the first positive jump of the signal $\overline{C2}$ after the appearance of the pulse of the signal IFCC which had caused the triggering of the flip-flop 115. The latter remains in the working state just long enough to allow four impulses α to pass which cause therefore the transmission of a single digit from the buffer-memory into the register 101. Afterwards, there passes a number of cycles of 0.01 seconds equal to the digit which was transmitted from the buffer-memory until the flip-flop 107 triggers anew, at the beginning of the last period of 1, then returns to the rest state at the end of this latter period. This will reset the first flip-flop of the counter 110 but will not cause a new triggering of the flip-flop 115, the jump applied to its clock input then being negative. In these circumstances, the setting of the flip-flop 107 would have entered the value 3, 5 and 7 into the register 101, according to the aforementioned wiring installation. A period of 0.03, 0.05 or 0.07 seconds will take place, therefore, until the next actuation of the flip-flop 107 which, via the first flip-flop of the counter 110, will make the flip-flop 115 function anew, this, then, will result in the transmission of a new digit from the buffer-memory into the register 101. The same process will respeat itself until all the digits stored consecutively in the buffer-memory have passed into the register 101.

It is to be noted, moreover, that the first flip-flop of the counter 110 sends an information ENI, on the one hand, to the display unit 200 but above all to the reset input terminal of a univibrator 120 which tends to be actuated through it clock input each time flip-flop 116 is being set. Hence, during the cycles where the register 101 counts down the digits transmitted from the memory, the univibrator 120 is free to function and it supplies an impulse of 60 milliseconds, every 100 milliseconds, that is to say, each time the flip-flop 116 changes over to the working state following the flip-flop 117 upon command of the signal IFCC. The output of the univibrator 120 will therefore send out a signal which is exactly that which should be fed onto the telephone line. This signal, by way of an inverter 121, a gate 122 and a power amplifier 123, will actuate a transmission relay 124 which will cause the switch-off pulses on the telephone line required for the transmission of the telephone number.

If, at the moment the information ENS appears, the information $\overline{QP}$ coming from the general control was at the level 0, the gate 130 which resets the flip-flp 115 as well as the flip-flop 117 would not become open and these two flip-flops would remain in the working position. The gate 131 would, therefore, continue to transmit permanently the impulses α. This is what occurs in the general control when the key P (pause) is actuated instead of the key CL or the key CONT. In these circumstances, the bits of the buffer-memory are transmitted into the register 101 at the rate of the signal α, that is to say, the 64 bits would pass through in approximately 1/1000th of a second. However, it is apparent that two gates 132 and 133 are connected to the outputs 4 and 8 and to the outputs 2 and 8 of the register 101, respectively, these gates, moreover, receiving an impulse from the flip-flop 116 which is very brief as this flip-flop is reset by the signal α as soon as it has changed to the working state. During this impulse, the presence of a pause order information transmitted from the buffer-memory is detected by the gate 133, inasmuch as this pause order, initially having the value 12, has only the value 11 once entered into the register 101. If it had the value 10 it would be detected in the same manner by the gate 133. As for the gate 132, it detects the values 12 and more, that is to say, the values which initially were of 13 and more, this gate 132 detecting then the fact that no more significant information is in the buffer-memory, whether the latter has not been completely filled up (number or less than 16 digits on the track of the (6,144 bit memory) or whether the latter has been completely filled up but has already transmitted its sixteen digital data. In the one case as in the other, an information 15, transformed to information 14 in the register 101 actuates the two gates 132 and 133 at the same time. The gate 133, by way of the information $\overline{RZPJ}$, resets the flip-flop 146 in the general control, which resets the flip-flop 715 of the functional control; this interrupts the transmission of the impulses as the first flip-flop of the counter 110 cannot trigger anymore. If, only the gate 133 has actuated, the flip flop 716 of the functional control will remain in the working position and the information TREX will be maintained, which means that the pause state is achieved. If the gate 132 has also actuated, a signal $\overline{DF}$ is sent to the functional control and the flip-flop 716 will also return to the rest state, which means the complete termination of the process for the transmission of impulses. It is to be noted that the information $\overline{RZPJ}$ also resets the flip-flop 417 of the general control so that the rapid advance system stops at the detection of the first pause signal. It is in this way that the first digits memorized on a track can be short circuited in less than 1/1000th of a second in order to reach, in an almost instantaneous manner, the position of the first pause signal from which, if need be, a number memorized on the second part of the track can be played. It is very clear that the pause and end detection by the gates 132 and 133 functions as well in the normal dialing of digits conditions as in the rapid advance conditions. In this latter case, it is very possible that the timer 120 receives impulses but in any case the duration of less than 1 millisecond does not allow the relay 124 to move its armature and no impulse is sent onto the line in rapid advance conditions.

It is seen in FIG. 10 that the data ENS and $\overline{RE}$ actuate a relay 143, for the short circuiting of the receiver and microphone by way of a power amplifier 142, and a relay 141, for the red button, by way of a power inverter amplifier 140, respectively. Moreover, it is seen that the information T causes, by way of an inverter 145, the triggering of a flip-flop 146 which, by a power amplifier 147 drives at two windings relay 148. The latter switches over the primary winding of a transformer 149 and a resistor, that is to say, a total resistance hardly exceeds 200 ohms, in lieu of the receiver and microphone of the telephone set. A loudspeaker 150 is connected by way of a audio-frequency amplifier 151 to the secondary winding of this transformer 149.

A dial tone detector 155, connected parallel to the loudspeaker, feeds a level 1 to its output when it detects a dial tone on the telephone line. It is seen, moreover, that further states of the counter 110 are connected to the flip-flop 115 so as to count the digits consecutively transmitted for dialing the number. A decoding of the three last outputs of the counter 110 and of the inverse, established by an inverter 158, from its first output, is made with the aid of a NAND gate 156, and allows for the recognition that a determined amount of consecutive digits have passed or not. A flip-flop 160, set at the moment the information ENS appears and on the condition that the information $\overline{QP}$ does not signal a rapid advance process, is reset if the amount of consecutive digits. in question has been transmitted. A gate 161 allows the signal originating from the dial tone detector to pass on condition that the flip-flop 160 is still in the working state, with the result that a dial tone detector causes the delivering of a level 0, constituting an information $\overline{CAUT}$, into the general control, this level 0 having the same function as pressing on the key CONT, as long as the amount of consecutive digits which have just been dialed do not exceed the limit that can be made by simple wiring modifications, as FIG. 10 shows. The amount of digits just after which this continuation of dialing upon receiving the dial tone can still take place is indicated, dependent on the different possibilities of internal wiring, by a list for this reason in FIG. 10.

Further to be noted in FIG. 10 is a flip-flop 170 which enables, upon command of a key comprised in the general control, to switch on the conference system, the latter, however, only being maintainable if the telephone receiver has been unhooked, this being signaled by a series connected low impedance relay 171. The contact of this relay 171 is delayed by a capacitor followed by a Schmitt-trigger 172, and the information fed out of this trigger is used, on the one hand, by way of an amplifier 173 and a gate 174, to reset the flip-flop 146 in order to reconnect the receiver when it is unhooked, and, on the other hand, by a gate 177 and an inverter 178 in order to cause the resetting of the conference flip-flop 170 when the receiver is unhooked, in order to avoid the risk that the line is not restored. The output of this conference flip-flop 170 actuates, by a power inverter 179, either the relay 148 again (by its second winding) and in this case only the londspeaker is in operation in the conference system and must be turned off in order to be able to talk (simplex system) or it actuates a relay 180 which connects the loudspeaker without disconnecting the microphone and the receiver (duplex system), but this solution could, in certain cases, produce a howling noise risk due to the Larsen effect.

At the bottom right of FIG. 10, the special pick-up connector foreseen for the connection to the telephone line is further seen between the telephone set and the line leading to the central exchange.

The part of the apparatus constituting the display unit (or visual indicator) 200 shown in FIG. 11 is made up of a sub-assembly which, as has been pointed out, can either be integrated in apparatus or constitute a separate unit connected to the apparatus by a cable. This indicator unit can, on the whole, be in three states which are: the rest state where it does not supply any indication, the state for the visual indication of the storage where it supplies the indication of the digits which are prepared successively in the buffer-memory in order to store them on a track, and the state for the visual indication of the transmission of a composed number where it supplies the indication of the successive digits which are sent onto the telephone line by the transmission device for automatically dialing a number. The state for the visual indication of the transmission is equally signified by the information QJ which means that the play process is in operation or by the information TREX which means that one is on a track in the framework of a transmission process (or dialing of a number), the data TREX and QJ together present meaning that the dialing actually takes place whereas the information TREX along signifies that one is stopped at a pause within a track. In any case, the data QJ and TREX actuate an OR gate 201 whose output has a state 1 when the display is in the state for the visual indication of transmission.

The state for the visual indication of the storage is signified by the information QMR which, for reasons which will be examined further on, is subject to a delay of approximately 2 milliseconds in a delayed repeater 203. The output of the latter as well as the output of the gate 201 and the information QMR entering in the display control the three inputs of a NOR gate 202 which, when it is excited, that is to say, when it supplies a level 0 to its output, sets the visual indicator in one of the two states of visual indication, that is to say, makes it leave its rest state. Further on it will be seen how the indication, supplied by the visual indicator can or cannot be cleared in the rest state.

The signals which leave the gate 201 and the delay element 203, respectively, signals which are never simultaneously at the state 1, control four branch selectors 206 to 208, 209 to 211, 212 to 214 and 215 to 217, respectively, which determine what the four bit information is which will be applied to the preparation inputs of a group of four 16 bit shaft registers 219 to 222 each of which receives one of the four bits of this information. If the display is in the state for the visual indication of storage, the level 1 produced by the delaying stage 203 will control the aforementioned branchings so that the information BAM, whose four parallel bits are fed from the four bit register 920 of the general memory 900, be applied to the preparation inputs of the four registers 219 to 222. On the other hand, a level 1 produced by the gate 201, in the state for the visual indication of the transmission, controls the said branchings so that they transmit to the preparation inputs of the four registers 219 to 222 a four bit information coming from the output of a binary counter 223 found in the indicator unit itself and which is arranged to assume a state corresponding to the number of impulses of each pulse train sent onto the telephone line for dialing a digit of a number.

The four clock impulse inputs of the registers 219 to 222 are connected parallel to the output of a NOR gate 225, three inputs of which are connected to the output of three AND gates 226, 228 and 230 so as to form a triple branching. When the indicator changes to the state of the visual indication of storage, the gate 228 receives the information QMR at the one input whereas at the other input it receives, inverted by an inverter 229, the level which is at the output of a timer (or delay arrangement) 227, the input of which also receives the information QMR. The second input of the gate 228 is thus still at the state 1 during approximately 1.5 milleseconds after the appearance of the information QMR then this input changes to the 0 state. Conseqently, the output of the gate 228, upon the establishment of the state for the visual indication of storage, changes to the state 1 during approximately 1.5 milliseconds. The output of the gate 225 then supplies to the clock inputs of the four registers 219 to 222 a command impulse such that these inputs, which receive at the rest state 1, change during an instant to the state 0 then return to the state 1. It is therefore the second slope of the impulse (positive) which commands the registration in the registers 219 to 222. During this first impulse of 1.5 milliseconds, the state at the output of the delaying stage 203 is still 0 and none of the four branchings in question are open so that the preparation inputs of the four registers have a level 0. This previous impulse will then shift all the data in the four registers one step creating in the initial stage a 0 state. In order to understand the use of this impulse, it must be borne in mind that the sixteen outputs of each of the registers 219 to 222 control, by groups of four parallel outputs each coming from a register, sixteen display devices (or visual indicating devices) comprised in a group 232 of visual indicating elements. Each device comprises a seven segment visual indicating cell and a special coder SPC the internal diagram of which is shown in a frame designated with broken lines in FIG. 11. It is seen that this special coder transforms the value BCD 10 to value BCD 0 in order to apply it to a BCD/7 segment decoder. At the same time, this value 0 coming from the transformation of the value 10 controls the BCD/7 segment decoder (classical) comprised in the special coder SPC so that it does not switch off upon receiving the information 0. If, on the other hand, the information 0 is fed to the input of the element SPC, it is also transmitted to the input of the BCD/7 segment decoder but the latter is not controlled for keeping alight the indication 0, and this zero therefore is not displayed, the seven segments remaining extinguished. The BCD/7 segment decoder comprised in each SPC element is similar to the decoders 501 and 502 serving the track number display (FIG. 5). Hence, if four corresponding outputs of the registers 219 to 222, for example, the outputs A7, B7, C7 and D7 all have the state 0 (value BCD 0), the corresponding field (in the example the seventh field from the right) is extinguished. If, on the other hand, these four outputs had binary levels corresponding to the value BCD 10 this same field would display a 0

It is possible, with the aid of a holding switch, to maintain the indication visible in the indicator even when the latter returns to the rest state. If several successive storages are made, the previous storage will remain visible at the moment when the following is being effected, the preceding storage being driven to the left by the appearance of the following. The 1.5 milliseconds impulse previously mentioned thus causes beforehand the shifting of all of the previous storage indications one space to the left, and establishes and extinguished field which, when the new storage indications successively enter from the right, will remain in order to mark the separation between the old indication and the new one, this free field naturally being also driven to the left as the new indication advances. This possibility is very advantageous for the case where a series of telephone numbers should be stored: the number previously stored still remains at least partially during the storage of the following, which permits avoiding errors (which would consist, for example, of skipping a number on a handwritten manuscript or of storing the same number twice in succession).

When the time delayer 227 has functioned, the clock inputs of the registers take up the level 1 again during at least ½ milliseconds then the delaying stage 203 functions and commands the branchings for the passage of the information BAM. At the same time, the information TAS can pass through the gate 226 and the gate 225 in order to be applied, with an inversion, to the clock imputs of the registers. This information TAS comprises impulses of level 1 which always occur when the information BAM is available, which will permit the entry into the registers 219 to 222 of each new digit temporarily recorded in the four bit register 920 of the general memory at the time of the storage preparation in a track.

It is to be noted that a pulse order information, corresponding to the value 12, is displayed, following the structure of the BCD/7 segment decoder, by a symbol which could have, if the decoder is adequately provided for, exactly the form of a P. There will be likewise the inscription of an unusual symbol corresponding to the value 15 when a digit overshoot occurs and the flip-flop 827 of the "conditions for storage and monitoring" unit will cause an annulation at the same time as a sweeping of the buffer-memory 910. The symbol, which will depend on the structure of the decoder, will show on the visual indicator that there is an "annulation of the attempt to store a wrong number".

In the "visual indication of transmission" state of the indicator, the level 1 at the output of the gate 201 opens the gate 230 at the same time as it commands the branchings in order to apply the levels of the output of the binary counter 223 to the preparation inputs of the four registers 219 to 222. The signal which is then fed to the clock inputs of the registers substantially consists of the information ENI which occurs when the first flip-flop of the counter 110 in the transmission unit 100 is in the working state. However, this information ENI is delayed approximately 1.3 milliseconds with respect to its change from the level 0 to the level 1. In this way, when there is a rapid advance process which lasts a maximum of one millisecond, no impulses are supplied to the clock imputs of the registers and there will be no indications in the group of fields of the visual indicator 232. In any case, the binary counter 223 is maintained at zero by means of an inverter 235 and a time delayer 236 as long as the said delayed information ENI is at the level 0. On the other hand, when the information ENI occurs at the same time as the sending of impulses signaled by the information SI in the indicator unit, the counter 223 is unblocked and may count the impulses sent onto the line (by their falling slope). When the information ENI returns to the state 0, after the sending of a digit (that is to say, of pulse train), the clock inputs of the four registers 219 to 222 receive a positive jump and the registers take up the information present at the four outputs of the counter 223, this latter being just then reset to zero, the time delayer 236, however, providing a sufficient delay so that the transmission of the digital information can correctly take place.

When the apparatus effects rapid advance operation, the information ENI is blocked during the rapid advance by the time delayer for the change to the level 1 237 (which, moreover, transmits instantaneously the change to the level 0), but there is a second time delayer arrangement 241, 242, controlled by an inverter 240, and owing to which a replacement impulse for the information ENI is sent, by a gate 243 and by the bias of an OR gate 238, if the rapid advance has ended at a pause state (QJ = 0, TREX = 1). If the information ENI has then disappeared, an AND gate 245 will command two OR gates 246 and 247 connected in series to two outputs of the counter 223, this will transform the value BCD 0 of the four outputs of the counter 223 to a value BCD 12 which, at the time of the delayed impulse artificially created by the time delayer of the univibrator type 242, will cause the inscription of a pause sign (preferably having the form of a P) in the first display field. This will occur if the pause has been extinguished by rapid advance as well as if it has been extinguished at the time of the dialing of a number. This indication of pauses could be useful when there is, for example, two numbers on the same track separated by a pause but themselves containing pauses in order to await the dial tone. Should the occasion arise, one would always know if one is stopped at the first, the second or possibly the third pause. It is clear that when the univibrator 242 functions in the normal dialing conditions, the information ENI remaining each time at the level 1 during approximately 100 milliseconds, the gates 245 will prevent the univibrator 242 from inopportunely causing the inscription of a pause indication.

There remains the extinguishing process when the gate 202 changes to the level 1, this means that the display returns to the rest state. The level 1 leaving the gate 202 is delayed by a time delayer 250 followed by an inverter 251 so that a gate 252 will become nonconducting approximately five seconds after the appearance of the level 1 at the gate 202. If, however, an IMMEDIATE EXTINCTION switch (29 FIG. 1) has been turned on, this will immediately transmit a level 0 to another input of the gate 252, by way of an inverter 254 and a gate 253, resulting from the presence of the level 1 at the output of the gate 202. When the gate 252 blocks, it causes the extinguishing of the indication by stopping the level 1 at a first input of NOR gate 256, by an inverter 255. A second input of this gate 256 receives the information $\overline{\alpha}$ which can pass through this gate if neither its first input nor its third input is at the level 1. In this case, impulses at the rate of the information $\alpha$ are supplied to the gate 225 which controls the clock inputs of the registers and, since the preparation inputs of the registers, then all have the level 0, it is a wave of 0 levels which spread throughout the registers and which causes the extinction of the display fields, the special coders SPC having detected a usual zero.

It is to be noted that a hold switch (28, FIG. 1) allows the application, by an inverter 258 and a gate 257, of a level 1 almost permanently to the third input of the gate 256: when this switch is turned off, there is neither the immediate extinction nor the delayed extinction when a level 1 appears at the output of the gate 202. However, the information $\overline{T}$ for the restoration and the reclaiming of the line is supplied to the two gates 257 and 252 so that, whatever the state of the two switches previously mentioned are, the signal $\overline{\alpha}$ may pass through the gate 256 during the impulse prior to the sending of digits of a number signaled by the information $\overline{T}$. Hence, before the apparatus proceeds to the effective dialing of a digit for which it sends impulses on the telephone line, the visual indication fields of the indicator unit 200 extinguish so as to avoid any confusion.

It is further interesting to note, referring to FIG. 4, how, in the example drawn in this figure, the different contingencies of the forbidden digits (CIT) and of the digits necessitating a monitoring (CNS) authorize or forbid the storage of telephone numbers on a special track. It is assumed that the apparatus is ajoining a telephone set connected to the internal central exchange of an enterprise, the dial of the telephone set being blocked. The user cannot start with a pause, the latter being a "forbidden digit" as the first number. He can, on the other hand, start with a zero which will cause the surveillance of subsequent numbers composed. If, on the other hand, he starts with another digit, it is because he wants to store an internal number and the surveillance stops. If the user has started with a zero, he is then obliged to store a pause as second digit, all the effective digits from 0 to 9 being forbidden in second position. The pause will allow the attaining of the dial tone of the local network; if the apparatus is equipped with a dial tone detector, this pause in second position will not even need a new manipulation for the continuation of the dialing. The pause in second position naturally maintains the surveillance. The user may not store a pause as third digit as this is a forbidden digit in third position, he cannot store a 1 in this position either (which is also a forbidden digit in third position), this will interdict the composing of a service number such as, for example, the sports results. The user can, on the other hand, store a zero in third position, that is to say, an exit from the lcoal network, this causing, of course, the continuation of the monitoring. If the third digit memorized is, on the other hand, other than the zero, this means that one remains within the local system and the monitoring ceases. The user may not store, as fourth digit, a pause and neither may he store a zero which prevents the storing of a telephone number for abroad. In the example, he may not store an 8 or a 9 either as fourth digit, this means that he may not store a telephone number for certain trunk line systems within the country but located, for example, a great distance away and with which the communications are costly. If a limitation of the amount of digits has not been established, an ulterior pause interdiction (IUP) may be established which will forbid the storing a pause further on than the fourth digit after which any number at all may be stored and particularly those which the apparatus arrangement interdicts.

The example of the apparatus which has just been described comprises possibilities for forbidden digits at the first four positions which asks for a possibility of discriminating the digits necessitating a monitoring at the first three positions. In a simpler variation, there could, of course, be only one forbidden digit, naturally at the first position, in order to avoid the exit onto the local network: no possibility for digits necessitating a monitoring would then be necessary. It would also be possible not to provide for any forbidden digit and to supply limitations, (for example, the interdiction for telephoning outside the local network) merely by a limitation of the amount of digits. In a simpler embodiment of this type, a certain number of elements shown in FIG. 8, in the unit for the conditions for memorizing and monitoring could be eliminated.

There are also a great number of other possibilities with the described apparatus, particularly because of the numerous possibilities for the internal wiring changes, which have been mentioned and which are shown in the drawing.

Finally, it must be noted that, for a series construction, the apparatus could be advantageously produced in integrated circuits on a large scale (LSI) which would allow it to be produced in a very small dimensions. One could, advantageously, have eight integrated circuit boards LSI corresponding to the eight units, respectively, shown in FIG. 2.

Test apparatuses were, however, produced with commerical integrated circuits of the TTL and/or C MOS type, which, although not having all the improvements previously described, consisted, from the point of view of the exterior aspect and of main manipulations, of prototypes bearing a resemblance to the apparatus which has just been described, their appearance hardly being any different to that of FIG. 1 (the sub-assembly 26, with the elements 27, 28 and 29, however, not appearing as well as the AUT switch, certain elements of particular arrangements of the FIGS. 1 to 11 also not being present in these prototypes). The apparatuses thus produced as prototypes and for testing purposes, in the meantime, were not of prohibitive sizes and could very well be placed near a table telephone set.

What is claimed is:

1. An electronic apparatus for the permanent storage and automatic dialing of telephone numbers, intended to be jointly connected with a telephone set, said apparatus comprising:
    a. a memory circuit having a plurality of tracks, each including a plurality of storage sections for storing digital data representing all the different figures capable of being included in telephone numbers;
    b. preparation and storage control means for entering digital data into said storage sections of a track of the memory circuit;
    c. means for sequentially reading digital data stored in said storage sections in the order in which the sections follow one another on a track;
    d. dialing and transmission means co-operating with said reading means for dialing the numbers represented by digital data successively read by said reading means from said storage sections and for transmitting the so read telephone numbers; and
    e. a command keyboard provided with members, the keying of which permits the selection of a track, a display being connected to said command keyboard for identifying the thus selected track, said command keyboard having means for selectively actuating one of said preparation and storage control means and sequential reading means wherein:
    f. said memory circuit also comprises, in each storage section, means for storing digital data representing an indication other than said figures capable of being included in telephone numbers, said other indication being a pause order; and
    g. said command keyboard further comprises:
        1. pause order storage means cooperating with said preparation and storage control means for storing, in a storage section of a selected track, digital data which represents a pause order;
        2. rapid advance command means for actuating said sequential reading means to successively read all the digital data stored in a selected track, until said reading means detects the data representing a pause order, in less than one second and without actuating said dialing means transmitting digits of telephone numbers;
        3. dialing command means for commanding the new dialing of a telephone number, including the pretransmission of an impulse for restoring, and then reclaiming, a telephone line, said sequential reading means cooperating with said dialing command means to stop the data reading and transmission of the corresponding telephone numbers upon detection of said pause order; and
        4. dialing continuation means cooperating with said sequential reading means for commanding the continuation of the dialing of a telephone number corresponding to previously unread data read by said sequential reading means subsequent to detection of said pause order.

2. Apparatus according to claim 1, wherein said preparation and storage control means comprises discriminatory means for authorizing the storage of a new telephone number only on certain special tracks among said plurality of tracks of said memory circuit; and further comprising total storage authorization code key means for overriding the operation of said discriminatory means to thereby permit the storage of a new telephone number on any selected track among said plurality of tracks of said memory circuit.

3. Apparatus according to claim 2, wherein said preparation and storage control means comprise digit number limiting means for prohibiting the storage on said special tracks of a number containing more than a certain amount of digits; said total storage authorization code key means being actuable to override the operation of said digit number limiting means and thereby permit the storage on said special tracks of numbers containing more than said certain amount of digits.

4. Apparatus according to claim 3, further comprising: further code key means actuable to override the operation of said digit number limiting means without affecting the operation of said discriminatory means.

5. Apparatus according to claim 4, wherein said preparation and storage control means further comprises predetermined digit limiting means for prohibiting the storage on said special tracks of a number commencing with certain predetermined digits; said total storage authorization code key being actuable to override the operation of said predetermined digit limiting means and permit the storage on said special tracks of numbers commencing with said certain predetermined digits; and said further code key means being actuable to overridge the operation of said predetermined digital limiting means without affecting the operation of said discriminatory means.

6. Apparatus according to claim 3, further comprising: means for commanding the transmission of said impulse for restoring, and then reclaiming, a telephone line each time a special track is selected by said command keyboard and a dialing command or a dialing continuation command is generated by said dialing command means or said dialing continuation command means, respectively.

7. Apparatus according to claim 6, wherein said predetermined digit limiting means are selectively provided for digits stored on several of the first storage sections of any track, monitoring means also be provided in order to recognize certain digits conditionally storable at the beginning of the track and to maintain in operation said predetermined digit limiting means on the subsequent storing sections only upon detection of said conditionally storable digit.

8. Apparatus according to claim 7, further comprising subsequent pause prohibiting means arranged to prohibit the storage of pause order data in all the storage sections of a track other than those where said predetermined digit limiting means are in operation.

9. Apparatus according to claim 1, wherein said memory circuit, said preparation and storage control means, said sequential reading means and said dialing and transmission means are arranged to process said digital data as four-bit BCD data, means being provided in cooperation with said command keyboard to establish said BCD data upon manipulation of certain corresponding keys of the keyboard, said reading means being arranged to recognize said pause order digital data in BCD data having a value greater than ten and less than fifteen.

10. Apparatus according to claim 1, wherein said memory circuit, said preparation and storage control means, said sequential reading means and said means for the dialing of a number are arranged to process said digital data as four-bits BCD data, means being provided in cooperation with said command keyboard to establish said BCD data upon manipulation of certain corresponding keys of the keyboard, said storage circuit comprising a permanent circulation dynamic memory register having a bit capacity equal to four times the product of the total number of said tracks times the number of said storage sections present in each track, means further being provided for establishing digital data of synchronous representation of the tracks, said digital data evolve synchronously with said circulation of the tracks in said memory register, the value of said data of synchronous representation increasing by one each time the amount of bits comprised in a track has circulated, means further provided to memorize in BCD form data which identify the selected track by a BCD value corresponding to an ordinal numeral being the sequential one of said selected track, dynamic comparison means being also provided for comparing bit by bit said data of synchronous representation of the tracks and said data which identify said selected track, by causing them to circulate, so as to ensure the recognition of the passage, in one location of the circulation of said memory register, of the bits which, among the entirety of the data memorized and circulating in said register, constitute the contents of said selected track.

11. Apparatus according to claim 10, wherein said reading means are arranged for causing the reproduction in a buffer memory of bits stored in said memory which pass the said location immediately after said comparison means have established the correspondence between said data of synchronous representation and said data which identify the selected track, said dialing means being arranged to cause said transmission device to successively dial the digits represented by the digital data formed by the bits thus brought into said buffer memory.

12. Apparatus according to claim 11, wherein said dialing means comprise:

a four-bit shift register with series/parallel input, means for introducing a BCD value into said shift register, means for causing the bits to circulate in series in said register one per unit-period of pulse of a telephone number, an assembly of gate circuits arranged as a binary subtracter-decrementer having a first input for a signal to be decremented connected to the last output of said shift register, a second input for receiving a decrementing command, a first output, giving an exclusive OR result connected to the series data input of said register, and a second output for decrement carry, a flip-flop receiving clock pulses at the same rate as the said register and whose data input is connected to said second output of said subtracter-decrementer for storing the decrement carry signal at the time of the passage of one bit, the output of this flip-flop being connected to said second input of the said subtracter-decrementer for furnishing said decrementing command at the time of the passage of the following bit, said flip-flop being set in operation at least at the beginning of each circulation of bits in said shift register, detection means for detecting the BCD value zero reached after a number of unit-periods equal to the BCD value introduced have flowed since the introduction of said value, bistable trigger means connected to detection means for being triggered from one state to the other at each actuation of said detection means, said means for introducing a BCD being arranged for introducing into said register, in response to the actuation of said detection means, alternately by its parallel inputs and when said trigger means are in a first state, a fixed BCD value corresponding to the desired interval between the sending of two successive digits of a telephone number, and, by its series input and when said triggering means are in their second state, a BCD value which corresponds to the next digit to be dialed and which is collected in said buffer memory, delayed dialing-pulse generator means being connected to said trigger means and arranged to transmit, only when said trigger means are in said second state, a dialing pulse of a telephone number during each of said unit-period, the duration of each said dialing pulse being a fraction of a said unit-period, and no impulse being transmitted when said trigger means are in said first state.

13. Apparatus according to claim 10, wherein said means for preparation and storage control are arranged to sequentially introduce to the said location of a memory register, immediately after said comparison means have established the correspondence between said digital data of synchronous representation and said digital data which identify the selected track, a group of bits previously taken up in a buffer memory in accordance with key manipulations of the said keyboard, the number of bits thus transferred being equal to four times the number of the said storage sections which are comprised in a track.

14. Apparatus according to claim 13, wherein said preparation and storage control means comprise, for the temporary introduction of a said group of bits into said buffer-memory in accordance with a manipulation of the keys of said keyboards:

an intermediary shift register with series/parallel input which is loaded with BCD data at the time of a manipulation of an entry key of the keyboard, transfer means for transmitting in series said BCD data from said intermediary register into said buffer-memory and for maintaining the transfer from the time said intermediary register has emptied to when the last bit position of the buffer-memory is filled, said transfer means comprising branching means with two inputs and one output, said output being connected to the series input of said buffer-memory, a first of said inputs of said branching means being connected to the last output of said buffer-memory and the second of said inputs of said branching means being connected to the last output of said intermediary shift register, branching control means being provided to control said branching means so as to cause, during a cycle of circulation of a number of steps equal to the number of bit positions of the buffer-memory, first of all the reintroduction at the input of said buffer-memory of significant BCD data which are found in the last bit positions of said buffer-memory, then, the BCD data collected from said intermediary shift register, the data coming out of this latter becoming non-significant as soon as the significant bits which were contained have been transferred, said branching control means comprising counting means, functioning according to a cycle having a number of counting steps greater by one than the number of four-bit BCD data which a buffer-memory can contain, said counting means being arranged for advancing by one step for each complete transfer of BCD datum into said buffer-memory, the passage of one determined beginning position of the cycle of said counting means causing the switching over said branching means and the increasing of cyclical retardation, due to the difference between the number of steps of said counting means and the number of BCD data sections in said buffer-memory, ensuring for all new BCD data introduced into said buffer-memory the preliminary transfer in looped circulation of all the BCD data which have already been previously introduced into said buffer-memory from the moment said buffer-memory and said counting means started to advance synchronously step by step and by starting without mutual retardation.

15. Apparatus according to the claim 10, wherein said means for forming said data of synchronous representation comprise a shift register which comprises as many elements, times four, as the said data of synchronous representation can comprise digits, said shift register cooperating with an adder and a carry storage element to increment the data held and circulating in said shift register during the course of its circulation, a cycle of which corresponds exactly in time to the circulation of a track in said dynamic memory register, the data circulating in said shift register constituting said data of synchronous representation.

16. Apparatus according to claim 10, wherein said storage circuit comprises 96 tracks, each comprising 16 said storage sections.

17. Apparatus according to claim 1, wherein said storage circuit comprises 96 tracks, each comprising 16 said storage sections.

18. Apparatus according to claim 2, wherein said preparation and storage control means comprises predetermined digit limiting means for prohibiting the storage on said special tracks of a number commencing with certain predetermined digits; said total storage authorization code key means being actuable to override the operation of said predetermined digit limiting means and thereby permit the storage on said special tracks of numbers containing said certain predetermined digits.

19. Apparatus according to claim 18, further comprising: further code key means actuable to override the operation of said predetermined digit limiting means without affecting the operation of said discriminatory means.

20. Apparatus according to claim 18, further comprising: means for commanding the transmission of said impulse for restoring, and then reclaiming, a telephone line each time a special track is selected by said command keyboard and a dialing command or a dialing continuation command is generated by said dialing command means or said dialing continuation command means, respectively.

21. Apparatus according to claim 1, further comprising a loudspeaker connected to said dialing and transmission means for causing it to send out, after stopping of the transmission of the digits, sounds, noises and conversations which come from the telephone line, said loudspeaker switching off when the receiver of said telephone set is hung up.

22. Apparatus according to claim 21, further comprising, parallel to said loudspeaker, an off-switchable dial tone detector arranged to cause an automatic actuating of said dialing continuation means upon receiving a dial tone when said reading means and dialing means are at rest after detection of a pause order.

23. Apparatus according to claim 22, further comprising means for counting the number of digits transmitted, which cooperate with said dial tone detector in order to leave it effective only till the uninterrupted dialing of a certain selected number of digits.

24. Apparatus according to claim 21, wherein said telephone set is provided with means for establishing a connection with a called telephone set upon lifting of the receiver of the first-mentioned telephone set from its craddle, said apparatus further comprising: conference command means for establishing a conference system including said loudspeaker when said receiver is lifted from said craddle, said conference system being automatically stopped when said receiver is replaced on said craddle.

25. Apparatus according to claim 24, further comprising: means for selectively electrically connecting or disconnecting said receiver from said conference when said conference system is established by said conference command means.

26. Apparatus according to the claim 1, further comprising an indicator device which consists of as many visual digit positions as a said track contains storing sections, and which furnishes:
in cooperation with said preparation and storage control means, the indication of digits prepared to be stored, and
in cooperation with said means for sequential reading and for dialing of numbers, the indication of the successively transmitted digits of the telephone number dialed in accordance with the number of impulses of the pulse trains successively sent out onto the telephone line, one train of ten impulses corresponding to zero, and said indication being collected at the output of dialing means and serving also for checking purposes.

27. Apparatus according to claim 1, wherein display means are provided for displaying the identity of the track selected in the form of a numeral corresponding to a number identifying said track, said displayed numeral blinking when said preparation and storage control means are in action and not blinking when they are not in operation, an auxiliary display dot further being, lit up when said reading means are in operation, blinking when these means are stopped within a track by a pause order and extinguished when these means are neither in operation nor stopped within a track.

* * * * *